US008856189B1

(12) United States Patent
Bull et al.

(10) Patent No.: US 8,856,189 B1
(45) Date of Patent: Oct. 7, 2014

(54) SYSTEMS AND METHODS FOR MANAGING CONNECTIONS TO PROCESS DATA

(75) Inventors: Steven Bull, Reading (GB); Andrew Gilbert, High Wycombe (GB); Stewart Waldie, Surrey (GB); Karl Woodrow, Thatcham (GB)

(73) Assignee: Symantec Corporation, Mountain View, CA (US)

( * ) Notice: Subject to any disclaimer, the term of this patent is extended or adjusted under 35 U.S.C. 154(b) by 797 days.

(21) Appl. No.: 12/692,467

(22) Filed: Jan. 22, 2010

(51) Int. Cl.
*G06F 17/30* (2006.01)
*G06F 7/00* (2006.01)

(52) U.S. Cl.
USPC .......................................... 707/802; 711/114

(58) Field of Classification Search
USPC .......................................... 707/802; 711/114
See application file for complete search history.

(56) References Cited

U.S. PATENT DOCUMENTS

| | | | | |
|---|---|---|---|---|
| 5,966,730 A * | 10/1999 | Zulch | ............................. | 711/162 |
| 6,505,216 B1 * | 1/2003 | Schutzman et al. | ... | 707/999.202 |
| 6,732,360 B1 * | 5/2004 | Seo et al. | ....................... | 719/310 |
| 6,745,197 B2 * | 6/2004 | McDonald | ............. | 707/999.102 |
| 7,107,298 B2 * | 9/2006 | Prahlad et al. | ................. | 707/640 |
| 7,146,387 B1 * | 12/2006 | Russo et al. | ........... | 707/999.202 |
| 7,155,633 B2 * | 12/2006 | Tuma et al. | ..................... | 714/5.1 |
| 7,165,082 B1 * | 1/2007 | DeVos | .......................... | 711/162 |
| 7,363,359 B1 * | 4/2008 | Tripathy et al. | ................ | 709/223 |
| 7,809,914 B2 * | 10/2010 | Kottomtharayil et al. | ..... | 711/170 |
| 7,958,307 B2 * | 6/2011 | Kavuri et al. | .................. | 711/114 |
| 2004/0088413 A1 * | 5/2004 | Bhogi et al. | ................... | 709/226 |
| 2006/0041660 A1 * | 2/2006 | Bishop et al. | ................. | 709/224 |
| 2007/0168435 A1 * | 7/2007 | Moraca et al. | ................ | 709/206 |
| 2009/0234957 A1 * | 9/2009 | Li et al. | .......................... | 709/229 |
| 2010/0023725 A1 * | 1/2010 | Huber et al. | ................... | 711/173 |

* cited by examiner

*Primary Examiner* — Pavan Mamillapalli
(74) *Attorney, Agent, or Firm* — Holland & Hart, LLP

(57) ABSTRACT

A computer-implemented method for managing connections to process data is described. A connection with an access server is established to determine a connection point associated with one or more targets. The one or more targets are arranged according to the connection points associated with each of the one or more targets. A connection with a first connection point is established. Data from one or more targets associated with the first connection point are processed. The connection with the first connection point is terminated.

16 Claims, 27 Drawing Sheets

SYSTEMS AND METHODS FOR MANAGING CONNECTIONS TO PROCESS DATA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve the functionality of computing devices. For example, computing devices may perform various functions on data. These functions may include archiving copies of data. Archived copies of data may be used to restore the data in the event the data become lost or corrupted.

In some instances, original data may be stored across various servers in an Exchange Server system. The Exchange system may include various interconnected servers that host numerous databases. A computing device that desires to perform various functions on data stored in the databases may connect to one or more of the servers that are part of the Exchange system. As a result, benefits may be realized by providing systems and methods for managing connections to process data from one or more locations in an Exchange system.

SUMMARY

According to at least one embodiment, a computer-implemented method for managing connections to process data is described. A connection with an access server is established to determine a connection point associated with one or more targets. The one or more targets are arranged according to the connection points associated with each of the one or more targets. A connection with a first connection point is established. Data from one or more targets associated with the first connection point are processed. The connection with the first connection point is terminated.

In one configuration, a connection with a second connection point may be established. Data from one or more targets associated with the second connection point may be processed. In one embodiment, the connection with the second connection point may be terminated.

In one example, the one or more targets may be an electronic mail mailbox. In addition, the one or more targets may be stored in one or more databases.

In one embodiment, the one or more databases may be organized into one or more groups of databases. One or more databases that have not been assigned to a group of databases may be identified. The one or more databases that have not been assigned to a group of databases may be assigned to a default group of databases.

A computer system configured to manage connections to process data is also described. The computer system may include a processor and memory in electronic communication with the processor. The computer system may also include an archiving application configured to establish a connection with an access server to determine a connection point associated with one or more targets. In addition, the application may be configured to arrange the one or more targets according to the connection points associated with each of the one or more targets, and establish a connection with a first connection point. The application may also be configured to process data from one or more targets associated with the first connection point, and terminate the connection with the first connection point.

A computer-program product for managing connections to process data is also described. The computer-program product may include a computer-readable medium having instructions thereon. The instructions may include code programmed to establish a connection with an access server to determine a connection point associated with one or more targets, and code programmed to arrange the one or more targets according to the connection points associated with each of the one or more targets. The instructions may also include code programmed to establish a connection with a first connection point, and code programmed to process data from one or more targets associated with the first connection point. The instructions may further include code programmed to terminate the connection with the first connection point.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
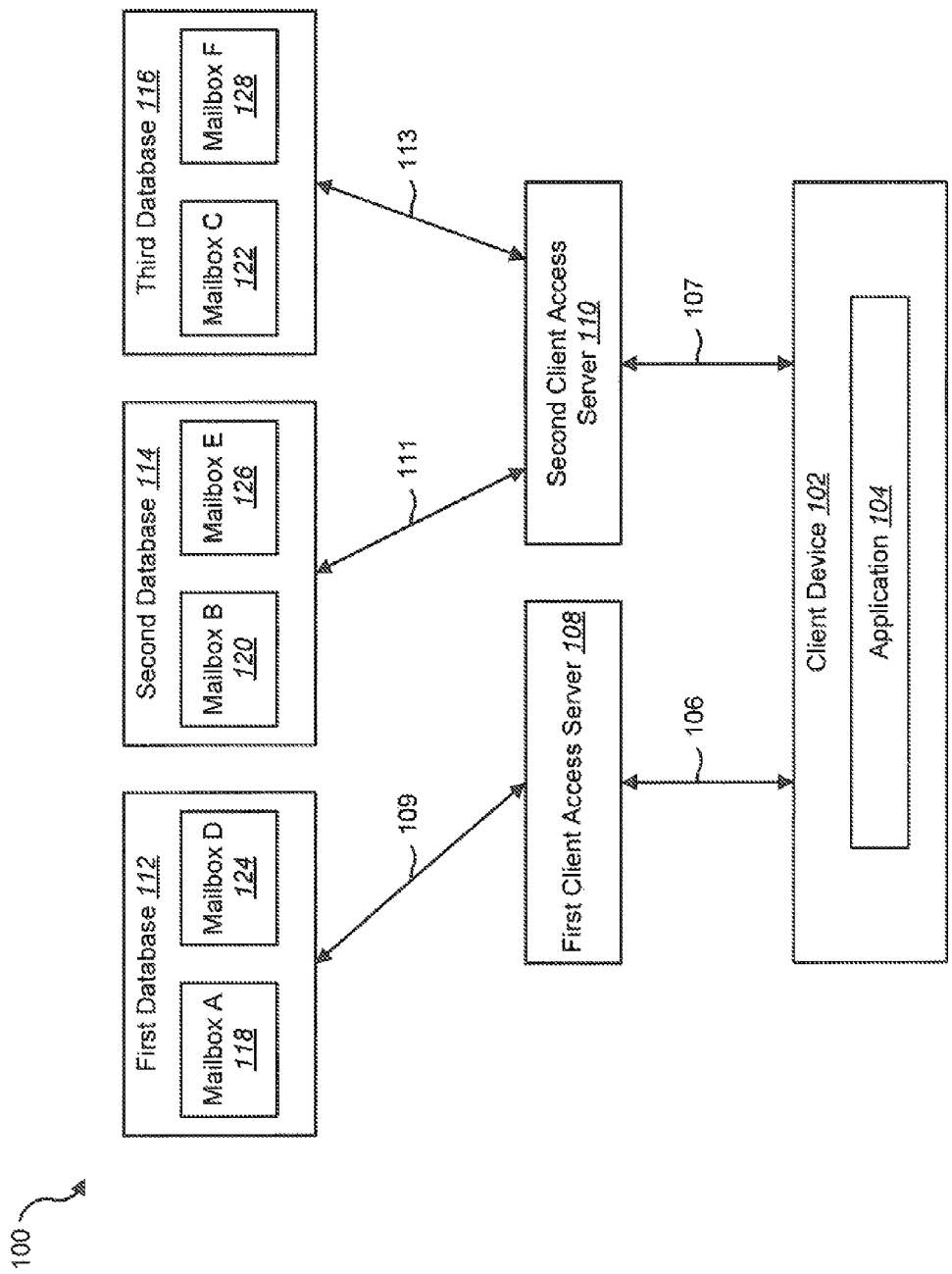
FIG. 1 is a block diagram illustrating one embodiment of an Exchange system in accordance with the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Enterprises may use specific servers to provide electronic mail functions, calendaring functions, contacts and tasks, support for mobile and web-based access to information, support for data storage, etc. An example of a specific server that an enterprise might use to provide these functions is an Exchange Server (also referred to herein as an Exchange system). In addition, enterprises may use an archiving application that connects to an Exchange server. The application may discover content held within an email mailbox, a file system, etc. An archiving application may also reduce the amount of storage required for emails on file systems. In one embodiment, an archiving application may manage the content of emails and file systems using automated, policy-controlled archiving to online stores for active retention and seamless retrieval of information.

In one configuration, the present systems and methods may optimize the number of connections that an archiving application establishes while processing mailboxes spread across different mailbox databases in a distributed Exchange system (such as the Exchange 2010 System). The present systems and methods may also minimize the number of Exchange application programming interfaces (API) context switches between connection points and may also optimize network traffic in a geographically distributed system. The present systems and methods may further configure an archiving application that processes mailboxes across multiple mailbox databases in an Exchange system. In one example, this may be achieved by grouping mailbox databases and applying application settings to various groups.

In one embodiment, the connection point for connections between an archiving application and a mailbox database in an Exchange system may be at a client access server (CAS) level. In other words, access to a mailbox database may be made through a CAS and access to different mailbox databases may be made through the same CAS. Each mailbox database may include one or more mailboxes. In addition, each database may be configured to be assigned a default CAS that is the preferred connection point for the mailboxes within that database. In one example, an Exchange system (such as the Exchange 2010 System) may include a database availability group (DAG). A DAG may be a group of Exchange servers that host one or more mailbox databases. These mailbox databases may be hosted by a home server, but the databases may also be replicated across other servers in the DAG. In other words, when the home server of a mailbox database fails, a copy of that database hosted by another server within the DAG may become available without any intervention by an administrator. This may be referred to as a "failover". For example, a mailbox database may failover from server A to server B if/when server A fails.

In one configuration, the Exchange servers in a DAG may be in the same geographical location or spread around the world at various locations. In an Exchange system, API connection points may be dynamic and may change as mailbox databases failover from one server to another server in the DAG. In an application that is targeting individual mailboxes in an Exchange system, there may be a large amount of context switching between connection points in order to process all of the mailboxes on different servers that are being targeted by the application. Large numbers of context switches may have a performance impact on the application. The number of context switches may also have a negative impact on the performance of an Exchange server. For example, if an Exchange system is set up so that several databases use the same connection point, performance issues may arise if the application is tied to processing only a certain connection point, rather than certain mailboxes. In one configuration, agents (or worker processes) of the application may be tied up processing a large mailbox database through a connection point and may not be able to process the other mailboxes through that same connection point. In addition, as previously explained, a mailbox database may failover from a first server at a first location to a second server at a second location (i.e., a remote site). The application may process mailboxes located at the second location and transmit information across a network. The network traffic between the application and the remote site may become large and unworkable.

In one embodiment, the use of the term "maintenance" below may describe an allocated period of time when an archiving application processes data within one or more targeted mailboxes. In one configuration, an administrator may desire to specify different maintenance periods for different applications to process the data. Examples of processing the data may include, for example, archiving the data, backing-up the data, etc.

In one configuration, a first server hosting a mailbox database may fail and the database (with the targeted mailboxes) may failover to a second server. The second server may be in a different time zone than the first server. The application may still be required to process the data within a certain maintenance period, regardless of where the data are currently active. For example, the end user whose mailbox is being processed, may be at a first location while the database that holds the mailbox has been moved across the world to a second location as a result of a failover. The end user may still expect, for example, an Outlook session to be responsive during their working hours regardless of where the database containing the mailbox is located. An archiving application may be targeting hundreds of thousands of mailboxes across thousands of mailbox databases which may require the use of time and resources to configure the application.

In one embodiment, an archiving application that targets an Exchange system may connect to a CAS rather than connect directly to a server that hosts a mailbox database that includes the targeted mailboxes. In one example, the CAS may channel the request from the application to the appropriate mailbox server. The present systems and methods may minimize the creating and discarding of connections that may be required to process individual mailboxes that are spread across a number of mailbox databases. This may be achieved by intelligently sorting a list of mailboxes that need to be processed so that all of the mailboxes with the same connection point may be processed one after the other. The current connection may be discarded when the application has processed all of the mailboxes that can be processed through the same connection point. Each mailbox database and, therefore, each mailbox may have a preferred connection point determined by the Exchange system. This may be determined by making a connection to the Exchange system to determine the preferred connection point for a particular mailbox database.

In one embodiment, an application may include a list of all the targets (i.e., mailboxes) to process. The application may make a single connection to an Exchange system to determine a connection point to use for each target. This may occur immediately before an application processes the mailboxes, periodically (e.g., once per day), etc. In addition, the query to determine the connection points to use for a target may occur when a particular event is executed. For example, the query may take place when a connection failure occurs during the processing of a target, when a slower than expected processing rate occurs, during an event log frenzy, when a specific event log entry occurs, when the system is otherwise idle, etc.

In one configuration, the targets may be ordered based on their connection point, and a connection may be established for the first target on the list. After the first target is processed, the remaining targets associated with the same connection point may also be processed. After all the targets of that connection point have been processed, the connection may be discarded. A new connection may then be established for one or more targets. This connection may be maintained until all targets assigned to that connection point have been processed. This sequence may be repeated until all the target mailboxes have been processed.

FIG. 1 is a block diagram illustrating one embodiment of an Exchange system 100. The system 100 may include a client device 102 on which an application 104 may be executed. In one configuration, the client device 102 may be a personal computer (PC), a laptop, a personal digital assistant (PDA), or any other type of computing device. The application 104 may be an archiving application that may process data, archive data, etc.

The system 100 may also include one or more databases 112, 114, 116. Each of these databases 112, 114, 116 may include one or more mailboxes 118, 120, 122, 124, 126, 128. For example, the first database 112 may include mailbox A 118 and mailbox D 124. The second database 114 may include mailbox B 120 and mailbox E 126. The third database 116 may include mailbox C 122 and mailbox F 128.

As previously explained, each mailbox database and, therefore, each mailbox, may be associated with a connection point. One example of a connection point may be a client access server (CAS). The connection point may be used by the application 104 to access the data within each mailbox. In one embodiment, a first CAS 108 may be the connection point for the first database 112 and the mailboxes 118, 124 within the first database 112. A second CAS 110 may serve as the connection point between the application 104 and the second database 114 and the third database 116.

In one configuration, the client device 102 may connect to the first CAS 108 through a first network connection 106. The client device 102 may connect to the second CAS 110 through a second network connection 107. The first CAS 108 may then connect to the first database 112 through a third network connection 109. Similarly, the second CAS 110 may connect to the second database 114 through a fourth network connection 111. The second CAS 110 may connect to the third database 116 through a fifth network connection 113.

As previously described above, the present systems and methods may minimize the number of connections that the application 104 must make in order to process data within the various mailboxes 118, 120, 122, 124, 126, 128 that the application 104 is targeting. For example, the application 104 may target mailbox A 118, mailbox B 120, mailbox C 122, and mailbox D 124 in order to process the data within these mailboxes. When the application 104 is initiated, it may make a first connection to either the first CAS 108 or the second CAS 110 in order to determine the connection points assigned to each of the mailboxes 118, 120, 122, 124 to be processed. The first connection may then be discarded. The targets, or mailboxes 118, 120, 122, 124, may be sorted based on the determined connection points. For example, the application 104 may determine from the first connection that mailbox A 118 and mailbox D 124 are associated with the first CAS 108 as their connection point. The application 104 may further determine from the first connection that mailbox B 120 and mailbox C 122 are associated with the second CAS 110 for their connection point. In one configuration, mailbox A 118 and mailbox D 124 may be included in a first list that identifies mailboxes that are associated with the first CAS 108. Similarly, mailbox B 120 and mailbox C 122 may be included in a second list to indicate that both mailboxes 120, 122 are associated with the second CAS 110.

In one configuration, a second connection may be established between the application 104 and the first CAS 108 in order to process mailbox A 118 and mailbox D 124. The application 104 may process first either mailbox A 118 or mailbox D 124. The application 104 may then process the other mailbox. Once all the mailboxes associated with the first CAS 108 are processed, the second connection may be discarded.

In one example, a third connection may be established between the application 104 and the second CAS 110 in order to process the mailboxes associated with the second CAS 110. Once all the mailboxes associated with the second CAS 110 are processed, the third connection may be discarded. As a result, using the above example, a total of three connections may be required in order for the application 104 to process the targeted mailboxes 118, 120, 122, 124.

Without using the present systems and methods, eight connections between the application 104 and the various databases 112, 114, 116 may be required in order to process mailbox A 118, mailbox B 120, mailbox C 122, and mailbox D 124. As an example, for each mailbox, a connection may be established to determine the connection point for that particular mailbox (i.e., four connections). Each of these connections may then be discarded. Another connection may be established with a preferred connection point in order to process a mailbox associated with that connection point (i.e., another four connections). As a result, eight connections may be required in order to process the four mailboxes referenced above.

Using the above examples, the connection count with the present systems and methods may be the number of preferred connection points plus one (e.g., Number of preferred connection points+1). The connection count, however, without using the present systems and methods may be two times the number of mailboxes the application 104 is targeting (e.g., 2×Number of targeted mailboxes).

Figure 2:
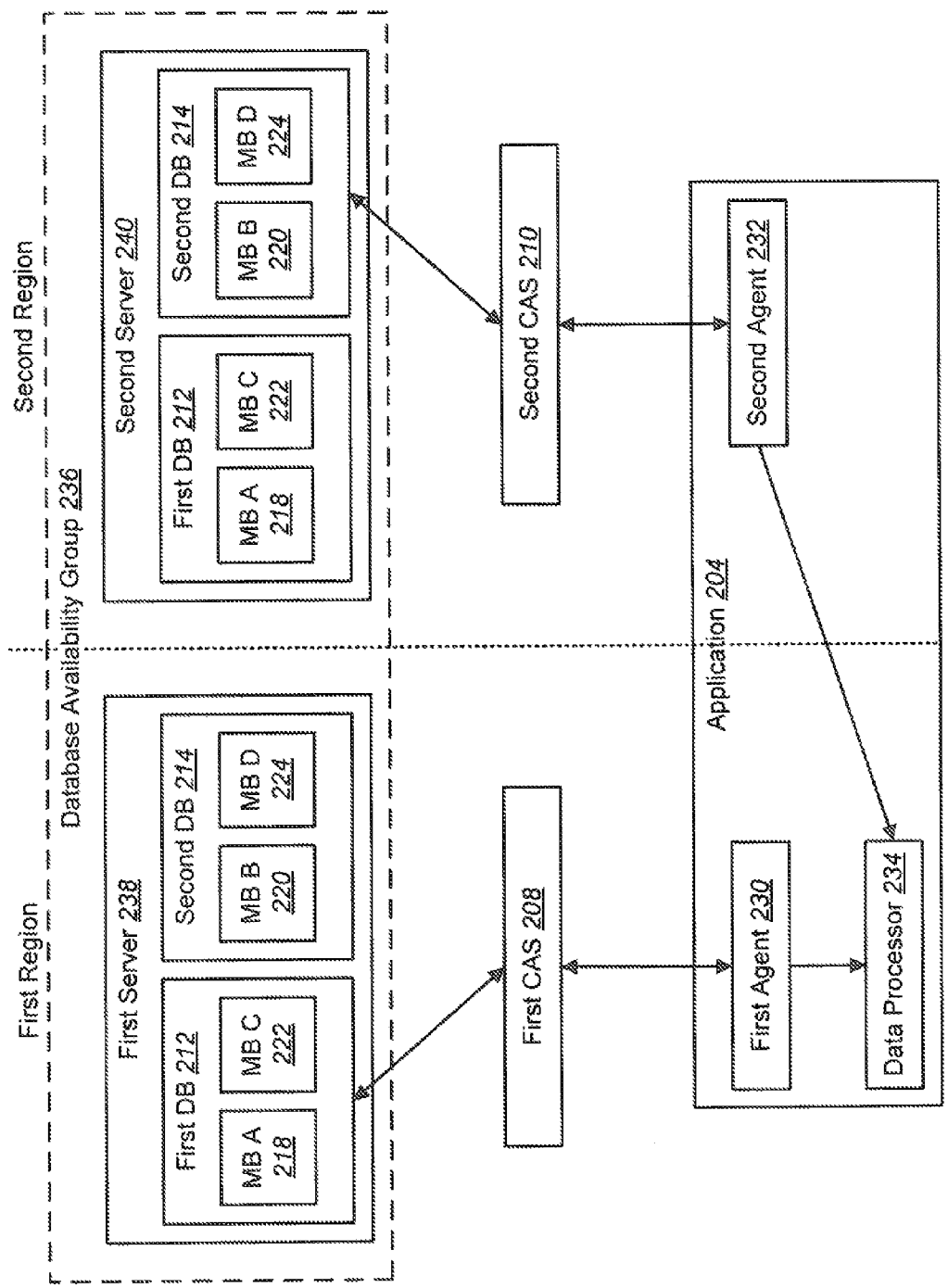
FIG. 2 is a block diagram illustrating one embodiment of an Exchange system that includes a database availability group.

FIG. 2 is a block diagram illustrating one embodiment of an Exchange system that includes a database availability group (DAG) 236. In one embodiment, the DAG 236 may include a first mailbox server 238 and a second mailbox server 240. Each server 238, 240 may be located in a different region. For example, the first server 238 may be located at a first region and the second server 240 may be located at a second region. In one configuration, each mailbox server 238, 240 may host a first database 212 and a second database 214. In other words, each server 238, 240 includes a copy of the first database 212 and the second database 214. Each database 212, 214 may include one or more mailboxes. For example, the first database 212 may include mailbox A 218 and mailbox C 222. The second database 214 may include mailbox B 220 and mailbox D 224.

In one example, the first database 238 may be live (i.e., running) in the first region while the second database 214 is dormant in the first region. The second database 214 may be live (i.e., running) in the second region while the first database 212 is dormant in the second region. A first CAS 208 may serve as the connection point for the first database 212 and a second CAS 210 may serve as the connection point for the second database 214. The first CAS 208 may be located at the first region and the second CAS 210 may be located at the second region. The first database 212 may be assigned to the first CAS 208 connection point. The second database 240 may be assigned to the second CAS 210 connection point.

An application 204 that processes the mailboxes on the Exchange system may have a first agent 230 and a second agent 232. The agents 230, 232 may perform the processing of data within the targeted mailboxes 218, 220, 222, 224. In one configuration, the first agent 230 may be located at the first region and the second agent 232 may be located at the second region. In addition, the application 204 may include a data processor 234 that is located at the first region.

The first agent 230 may process any mailbox using the first CAS 208 as a connection point. If, while processing a mailbox, the first agent 230 finds data to process, the data may then be passed to the data processor 234. The second agent 232 may process mailboxes that use the second CAS 210 as a connection point. If, while processing a mailbox, the second agent 232 finds data to process, the data may be passed over a wide area network (WAN) to the data processor 234. In one embodiment, the data that are of interest to the application 204 may be passed over the WAN. The majority of the work scanning the mailbox for interesting data may be executed locally at the connection points 208, 210.

Figure 3:
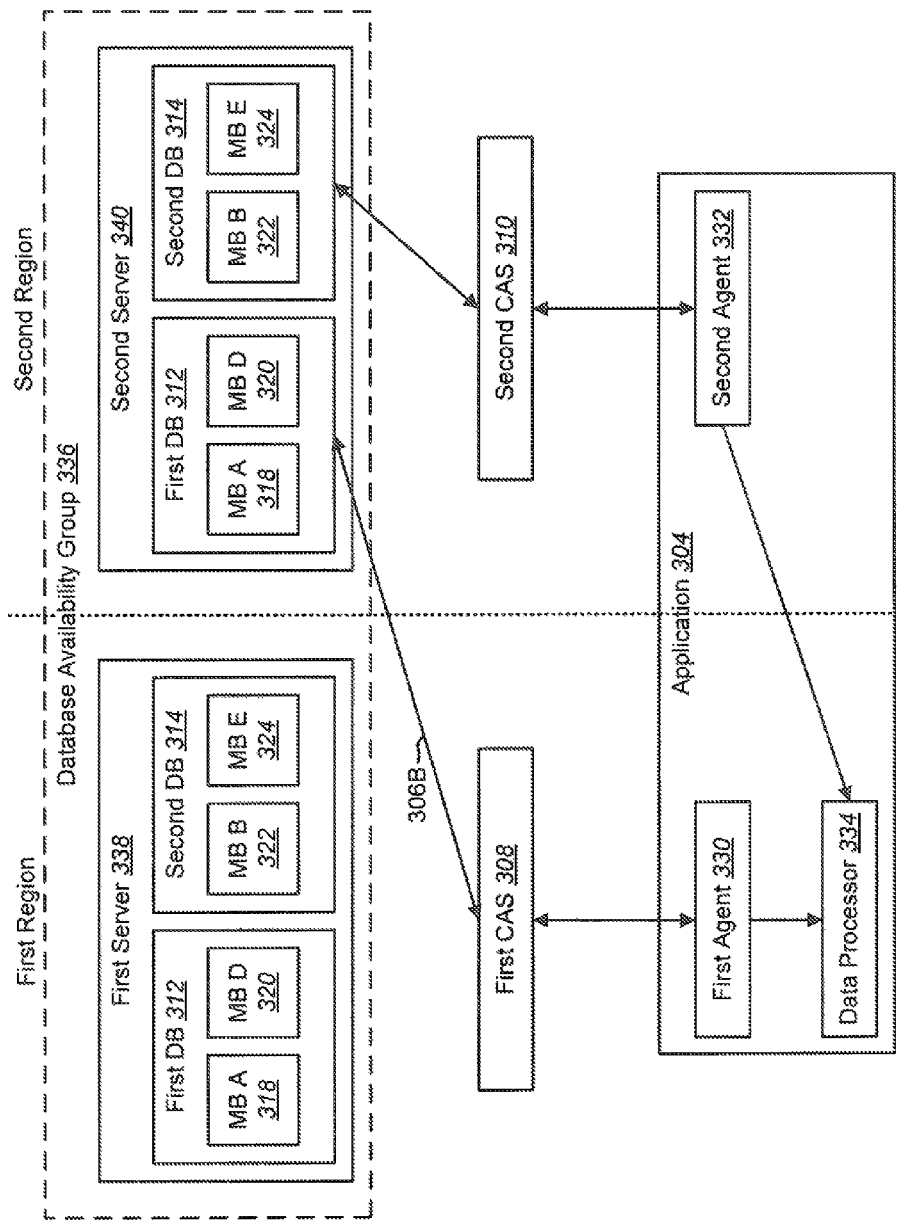
FIG. 3 is a block diagram illustrating one embodiment of a database failover when a server in a particular region goes offline.

FIG. 3 is a block diagram illustrating one embodiment of an Exchange system in which a database failover occurs when a server hosting the database fails. In one configuration, a first server 338 at a first region may fail or go offline. As a result, a copy of a first database 312 hosted by a second server 340 may become active or live. In one example, the second server 340 is located at a second region. The second server 340 may also include a second database 314. Each database 312, 314 may include one or more mailboxes. For example, the first database 312 may include mailbox A 318 and mailbox D 320. The second database 314 may include mailbox B 322 and mailbox E 324. As previously explained, the first database 312 may be associated with a first CAS 308 as a connection point for the application 304. The first CAS 308 may be located at the first region. The second database 314 may be associated with a second CAS 310 as a connection point for the application 304. The second CAS 310 may be located at the second region. After the first database 312 failsover to the second server 340, the first CAS 308 may still be the preferred connection point for the first database 312.

In one embodiment, the application 304 may target and process various mailboxes located within mailbox databases 312, 314. The application 304 may include a first agent 330 located at the first region and a second agent 332 located at the second region. In one configuration, the first agent 330 may connect to the first database 312 (hosted by the second server 340) via the first CAS 308. In addition, the second agent 332 may connect to the second CAS 310 in order to process mailboxes B 322 and mailbox D 324 within the second database 314.

When the first agent 330 connects to the first CAS 308 at the first region, the connection may be redirected across a WAN 306B to the first database 312 hosted by the second server 340 at the second region. As a result, increased traffic over the WAN 306B may exist because the mailbox processing for mailbox A 318 and mailbox D 220 is occurring over the WAN 306B. In other words, when the first CAS 308 connects to the first database 312 hosted by the second server 340, and data within the first database 312 are identified to be processed, the data may be transmitted across the WAN 306B to the first CAS 308 and then to the first agent 330. The first agent 330 may transmit the data to the data processor 334. The traffic across the WAN 306B may increase significantly as data are transmitted from the first database 312 (at the second region) to the first CAS 308 at the first region.

Figure 4:
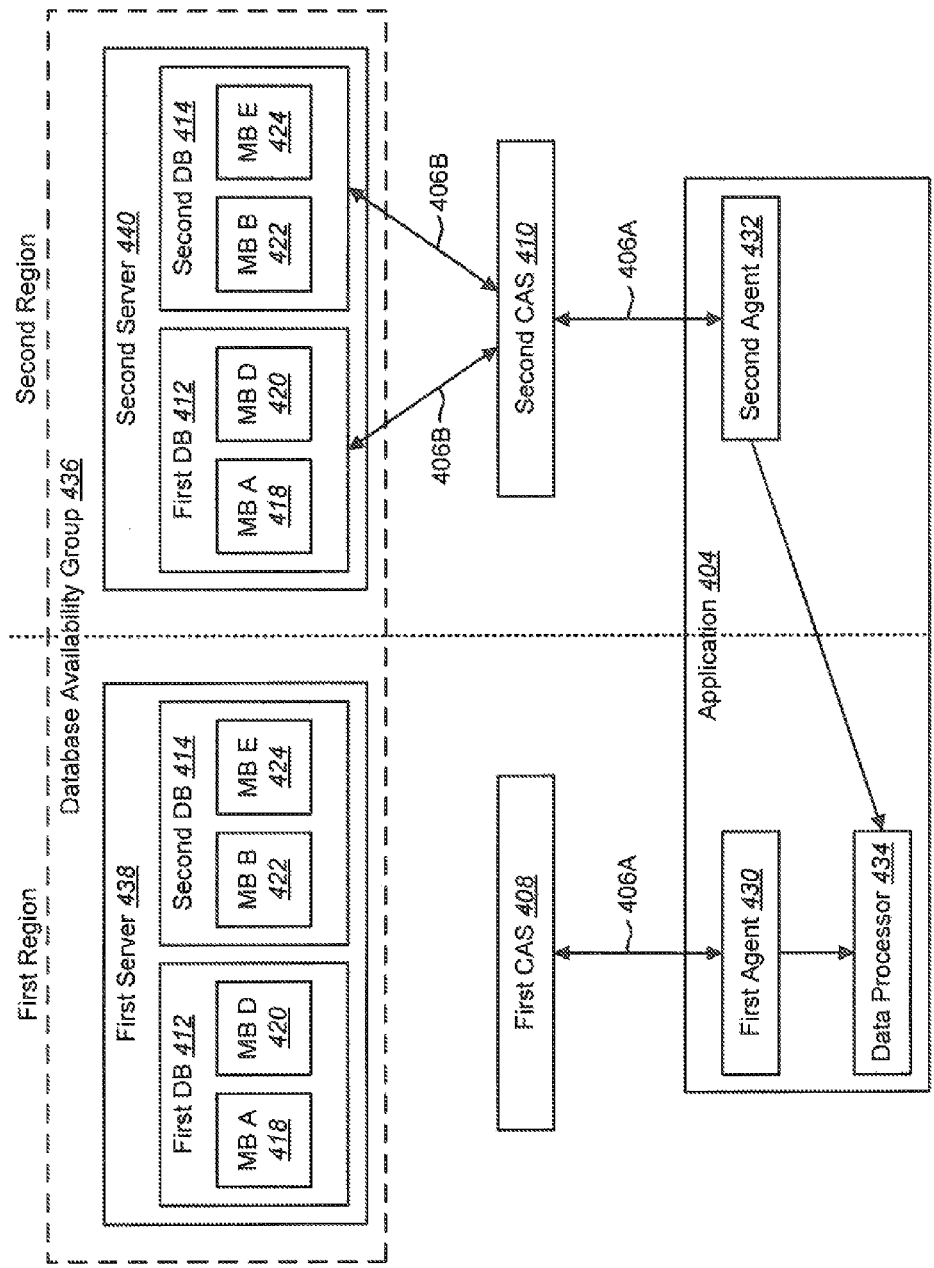
FIG. 4 is a block diagram illustrating another embodiment of an Exchange system in accordance with the present systems and methods.

FIG. 4 is a block diagram illustrating another embodiment of an Exchange system in which a first database 412 (hosted by a first server 438) failsover to a second server 440 when the first server 438 fails. In one example, the connection point for the first database 412 may be a first CAS 408 while the first server 438 is hosting the first database 412. When the first database 412 failsover to the second server 440, the connection point may switch from the first CAS 408 to a second CAS 410. In other words, an administrator may change the connection point for the first database 412 from the first CAS 408 to the second CAS 410.

In one embodiment, an application 404 may update a cache of connection points when the connection point for the first database 412 is switched to the second CAS 410. In addition, traffic across a WAN may be reduced when the connection point is switched. The connection point cache of the application 404 may be updated automatically when the application 404 become aware that processing performances are below a certain threshold. Alternatively, the connection point cache may be updated when a certain event occurs.

In one configuration, a first agent 430 may connect to a local connection point at a first region. For example, the first agent 430 may connect to the first CAS 408, however, in this example, there are no mailboxes to process because there are no mailboxes using the first CAS 408 as a connection point. In one embodiment, a second agent 432 may connect to mailboxes 418, 420, 422, 424 using the local connection point at a second region. For example, the second agent 432 may connect to the second CAS 410. In this example, the second agent 432 may process all mailboxes locally on the second server 440. If the second agent 432 locates interesting data in one of the mailboxes 418, 420, 422, 424, the second agent 432 may pass this information over the WAN to a data processor 434 located at the first region.

As described above, the present systems and methods allow an application 404 to use agents to process targets (such as mailboxes) that are at the same geographical region as the agents. Immediately after a database move or failover, the application 404 may continue to process all targets, however, network traffic may be increased. After the database move or failover, the connection points for the targets may be updated. The application 404 may automatically recognize the updates and only use an agent within the same geographical region to process the target. In one embodiment, the agents 430, 432 of the application 404 may be generic and may be able to process any target using all connection points across the Exchange system.

Figure 5:
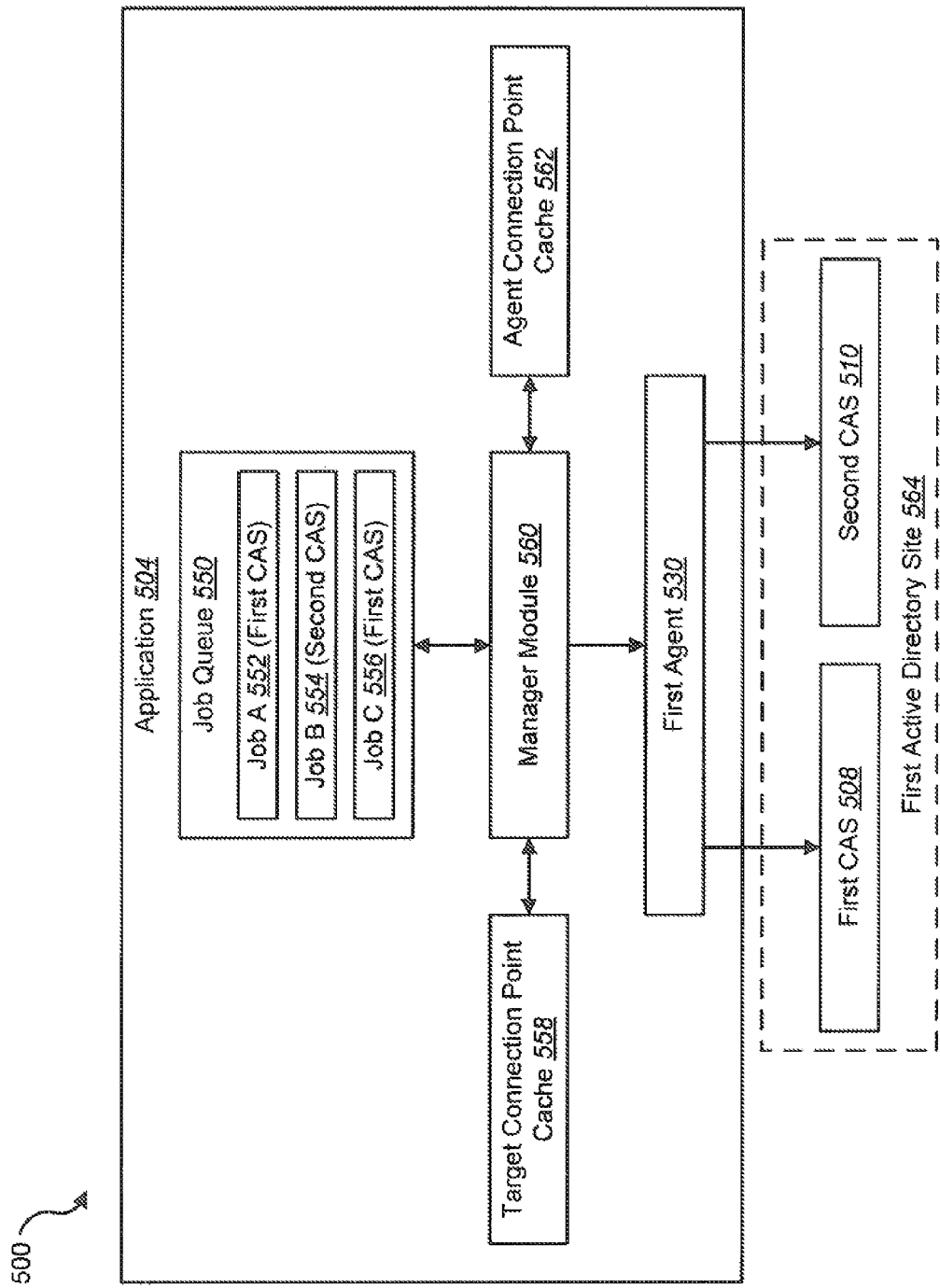
FIG. 5 is a block diagram illustrating one embodiment of job management system in accordance with the present systems and methods.

FIG. 5 is a block diagram illustrating one embodiment of a job management system 500 in accordance with the present systems and methods. In one example, an application 504 may include a first agent 530 that may process various mailboxes within various mailbox databases. In one embodiment, the first agent 530 may connect to a first CAS 508 and/or a second CAS 510 located within a first active directory site 564 in order to process the various mailboxes.

In one configuration, some of the jobs to be processed by the first agent 530 may be associated with the first CAS 508, and some other jobs may be associated with the second CAS 510. The jobs may be arranged so that the first agent 530 changes connection points between the first CAS 508 and the second CAS 510 as few times as possible. For example, if the first agent 530 is connected to the first CAS 508, all jobs requiring the first CAS 508 may be processed before the jobs requiring the second CAS 510.

In one example, the application 504 may include a job queue 550. The queue 550 may include a list of various jobs 552, 554, 556 to be performed by an agent, such as the first agent 530. Each job within the job queue 550 may be associated with a preferred connection point. For example, job A 552 and job C 556 may prefer or require the first CAS 508 as their connection point. Job B 554 may prefer or require the second CAS 510 as the connection point.

The application 504 may also include a manager module 560 to manage jobs for the first agent 530. The manager module 560 may access an agent connection point cache 562. The agent connection point cache 562 may identify the most recent connection point used by the first agent 530. In other words, the agent connection point cache 562 may indicate to the manager module 560 what the current connection point is for the first agent 530. In addition, the management module 560 may access a target connection point cache 558. The target connection point cache 558 may include a list of preferred connection points for various targets or mailboxes.

Figure 6:
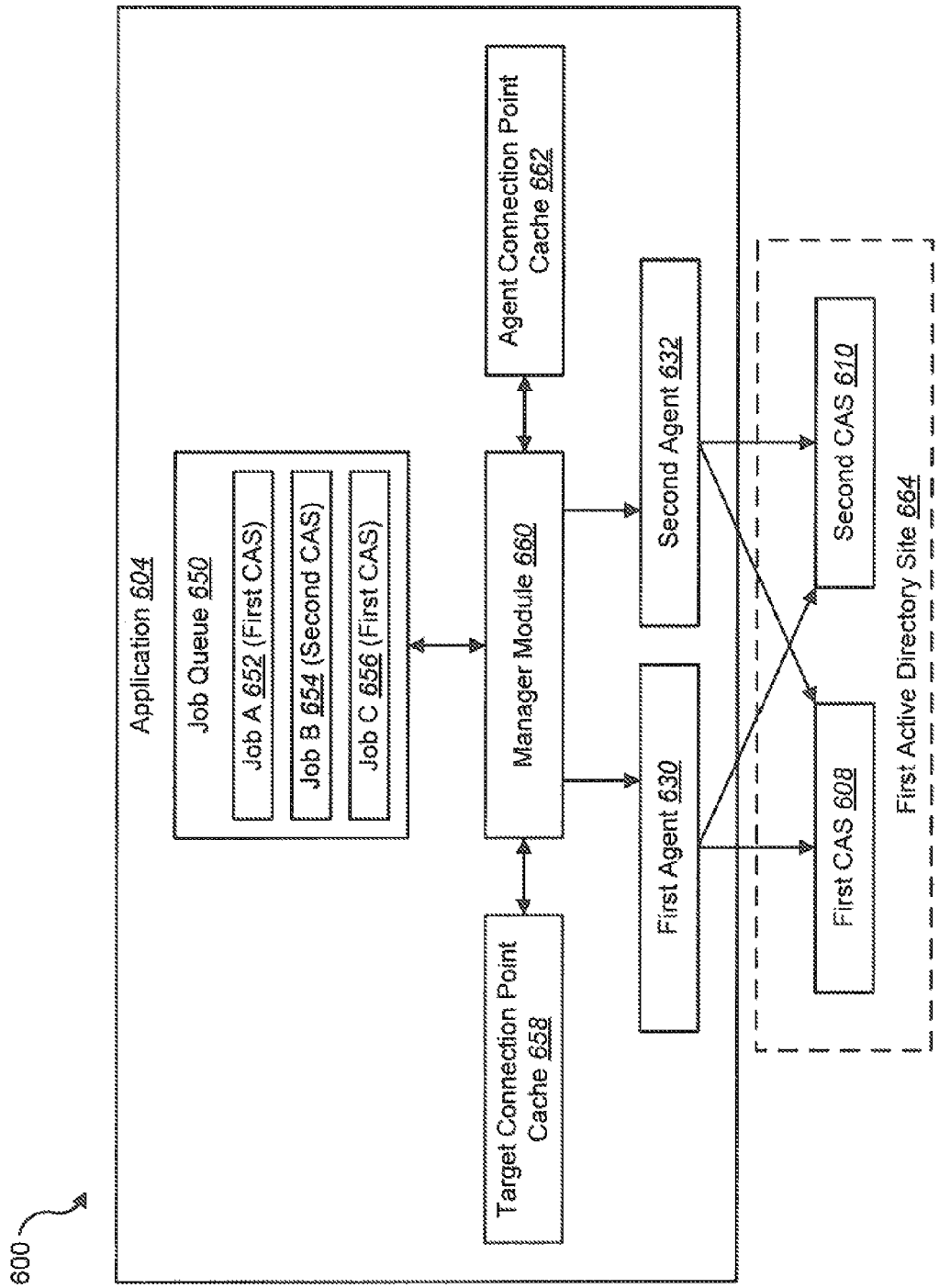
FIG. 6 is a block diagram illustrating another embodiment of a job management system.

FIG. 6 is a block diagram illustrating another embodiment of a job management system 600. In one embodiment, an application 604 may include a first agent 630 and a second agent 632. The agents 630, 632 may process various mailboxes or jobs. The application 604 may include a job queue 650, which lists the various jobs to be performed by either the first agent 630 or the second agent 632. A manager module 660 may manage the distribution of the jobs 652, 654, 656 to the first agent 630 and the second agent 632.

In one embodiment, the first agent 630 and a second agent 632 may connect to a connection point, such as a first CAS 608 or a second CAS 610, in order to perform the various jobs. The first CAS 608 and the second CAS 610 may be located at a first active directory site 664. In one configuration, the agents 630, 632 may not be tied to a particular connection point 608, 610. The jobs may be assigned to the agents 630, 632 by the manager module 660 so that each agent 630, 632 may change connection points as few times as possible. In other words, if the first agent 630 is using the first CAS 608 and the second agent 632 is using the second CAS 610, jobs (such as job A 652 and job C 656) requiring the first CAS 608 may be assigned to the first agent 630. Jobs (such as job B 654) requiring the second CAS 610 may be assigned to the second agent 632.

In one example, if there are no more jobs requiring the second CAS 610, but there are still jobs requiring the first CAS 608, the second agent 632 may be assigned a job by the manager module 660 that requires the first CAS 608. Similarly, if there are no more jobs requiring the first CAS 608 but there are still jobs requiring the second CAS 610, the first agent 630 may be assigned a job by the manager module 660 requiring the second CAS 610.

Figure 7:
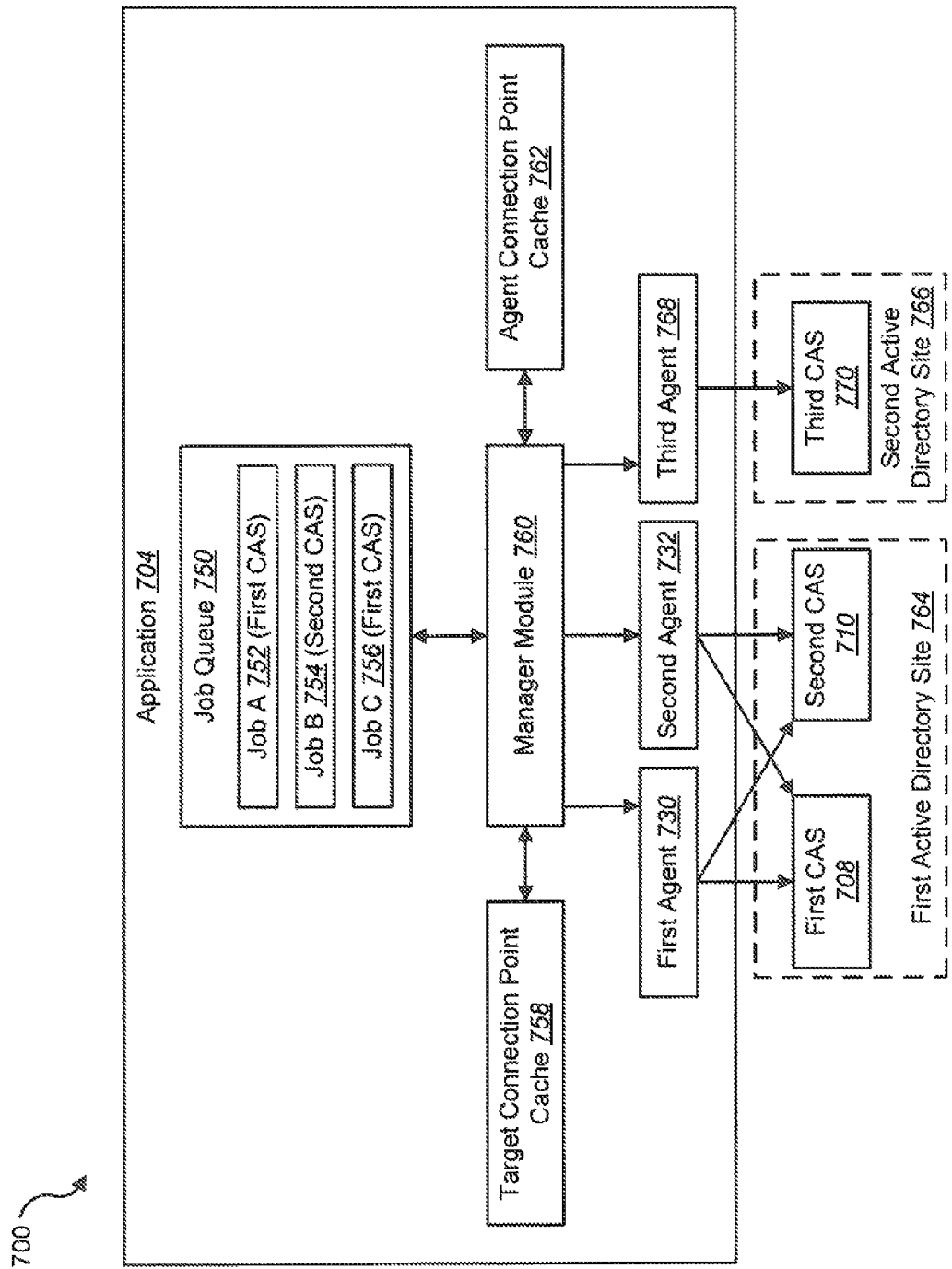
FIG. 7 is a block diagram illustrating another embodiment of a job management system.

FIG. 7 is a block diagram illustrating another embodiment of a job management system 700. An application 704 may include three agents 730, 732, 768 to process various jobs 752, 754, 756. Each agent 730, 732, 768 may use a connection point 708, 710, 770 in order to complete the jobs 752, 754, 756. For example, the jobs may include processing data within mailboxes. The mailboxes may be accessed from one or more of the various connection points 708, 710, 770.

In one embodiment, a first agent 730 and a second agent 732 may be tied to a first CAS 708 connection point and a second CAS 710 connection point. A third agent 768 may be tied to a third CAS 770 connection point. In one configuration, the third agent 768 may be assigned the jobs requiring the third CAS 770 connection point. The first agent 730 and a second agent 732 may be assigned jobs requiring the first CAS 708 and the second CAS 710. The third CAS 770 may reside at a second active directory site 766 which may be different than a first active directory site 764. The first CAS 708 and the second CAS 710 may reside at the first active directory site 764. The third CAS 770 may be at a different active directory site than the other connection points in order to minimize network traffic.

In one example, special mailboxes, such as mailboxes belonging to a group of company executives, may have a dedicated connection point. The application 704 may be configured such that one agent, such as the third agent 768, may be reserved purely for processing the data of a special mailbox. In other words, the third agent 768 may be reserved to connect only to the third CAS 770, which may be the preferred connection point for a special mailbox.

Figure 8:
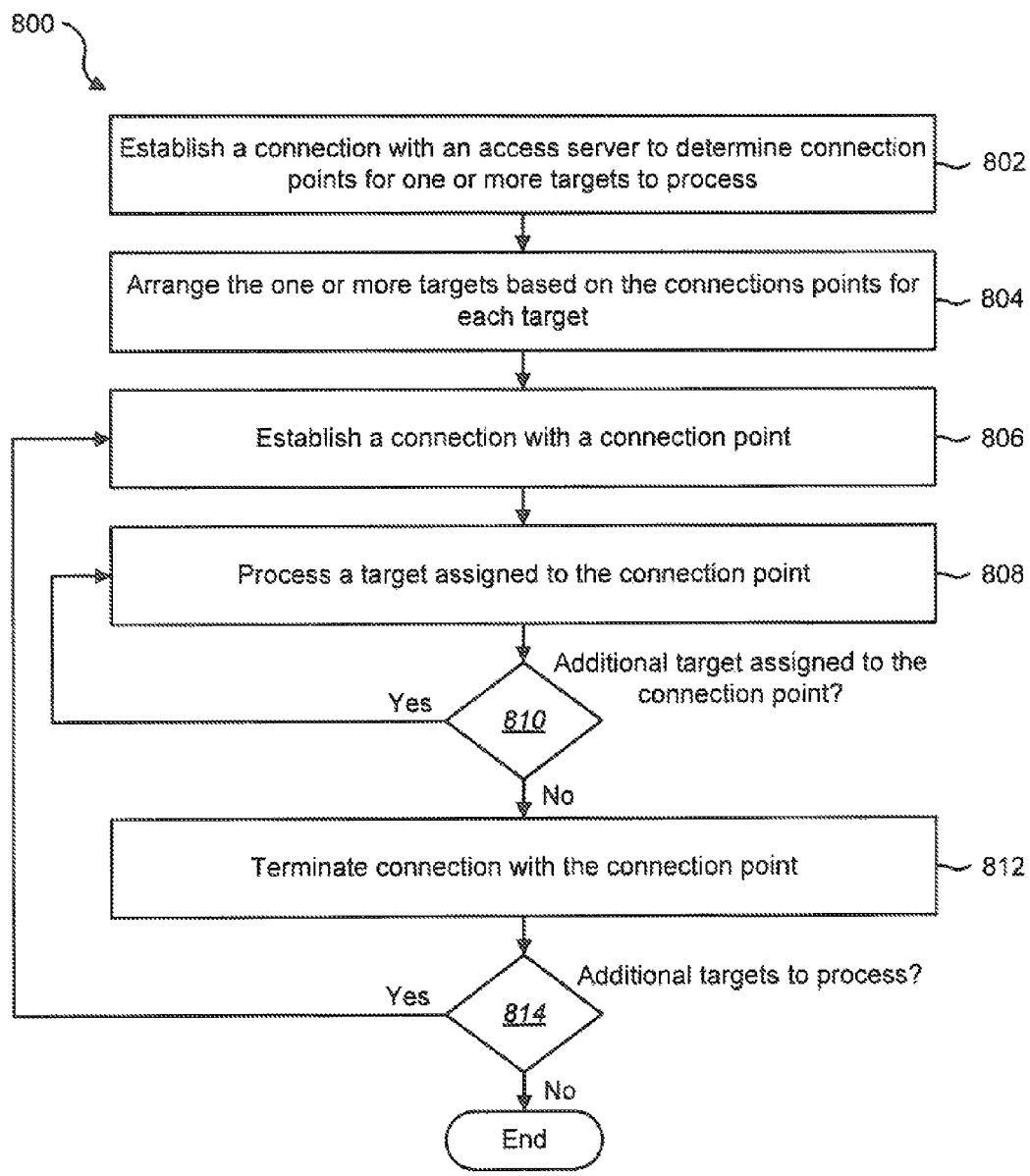
FIG. 8 is a flow diagram illustrating one embodiment of a method for managing connections in order to process various process data from one or more mailboxes.

FIG. 8 is a flow diagram illustrating one embodiment of a method 800 for managing connections in order to process various data from one or more mailboxes. In one example, the method 800 may be implemented by an agent within an application.

In one configuration, a connection with an access server may be established 802 in order to determine the connection points for one or more targets (or mailboxes) to process. The access server may be a client access server (CAS). The one or more targets may be arranged 804 in a certain order based on the connection points for each target. In other words, targets associated with a first connection point may be grouped together, and targets associated with a second connection point may be grouped together.

In one embodiment, a connection may be established 806 with a connection point, such as a first connection point. A target assigned or associated with the first connection point may be processed 808. A determination 810 may be made as to whether an additional target exists that is also assigned to the first connection point. If it is determined 810 that an additional target exists that is also assigned to the first connection point, the method 800 may return to process 808 the additional target associated or assigned to the first connection point. If, however, it is determined 810 that an additional target does not exist that is assigned to the first connection point, the connection with the first connection point may be terminated 812.

A determination 814 may be made as to whether any additional targets exist to process. If it is determined 814 that there are additional targets to process, the method 800 may return to establish a connection with a connection point, such as a second connection point, that is associated with the additional target. The second connection point may be different than the first connection point previously used. The method 800 may continue as outlined above. If, however, it is determined 814 that there are no additional targets to process, the method 800 may end.

Figure 9:
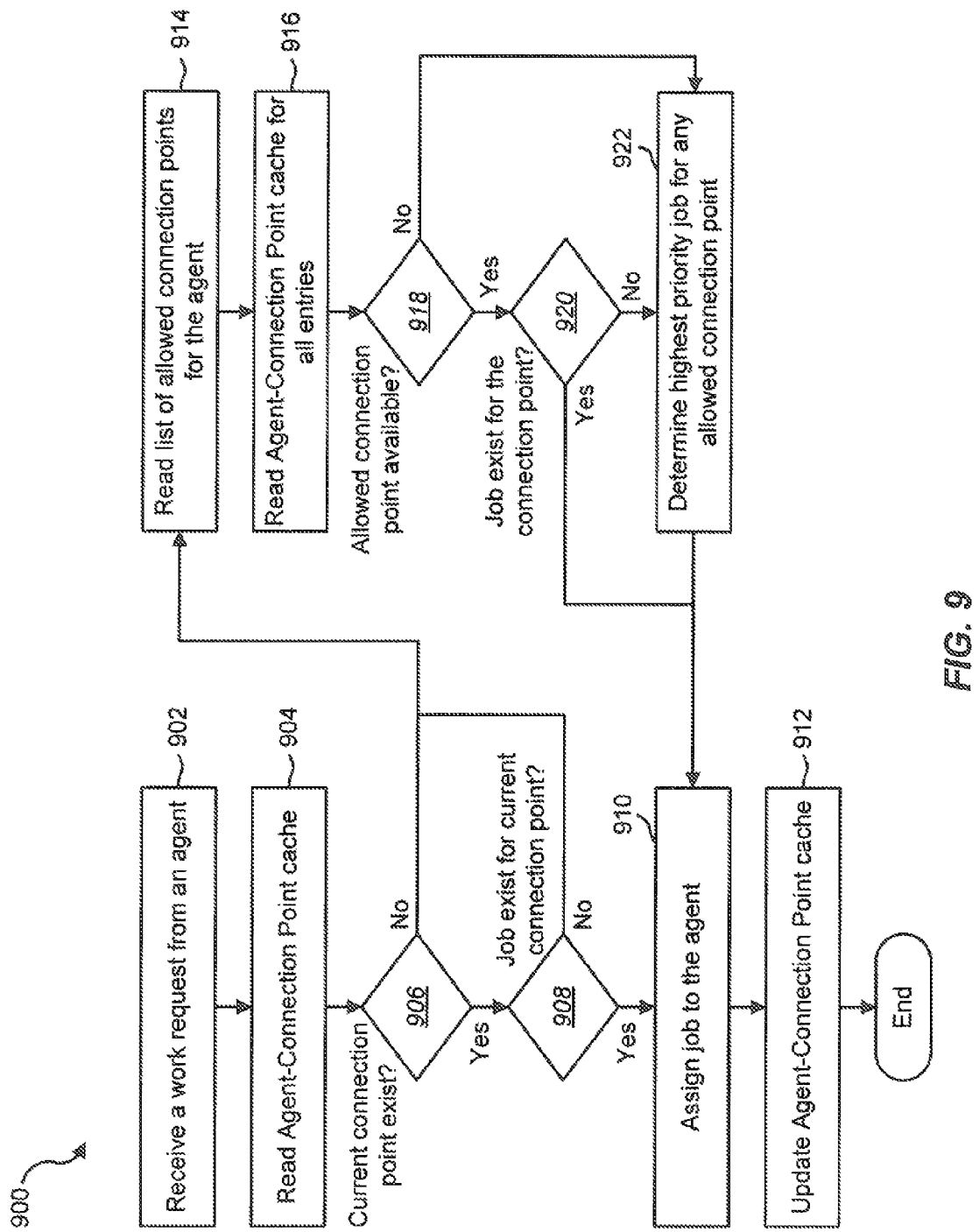
FIG. 9 is a flow diagram illustrating one embodiment of a method for managing various jobs assigned to agents of an application.

FIG. 9 is a flow diagram illustrating one embodiment of a method 900 for managing various jobs assigned to agents of an application. The method 900 may be implemented by a manager module 560 within the application.

In one embodiment, a work request may be received 902 from an agent. An agent connection point cache may be read 904 in order to determine 906 whether a current connection point exists for the agent requesting work. If it is determined 906 that a current connection point does not exist, a list of allowed connection points for the agent may be read 914. If, however, it is determined 906 that a current connection point does exist for the agent, a determination 908 may be raised as to whether a job exists for the current connection point. If it is determined 908 that a job does exist for the current connection point, the job may be assigned 910 to the agent. In one embodiment, the agent connection point cache may then be updated 912. If, however, it is determined 908 that a job does not exist for the current connection point, the list of allowed connection points for the agent may be read 914 as previously described.

In addition, the agent connection point cache for all entries may also be read 916 and a determination 918 may be made as to whether an allowed connection point is available. If it is determined 918 that an allowed connection point is not available, the highest priority job for any allowed connection points may be determined 922. The job may then be assigned 910 to the agent. The agent connection point cache may then be updated 912 as previously described. If, however, it is determined 918 that an allowed connection point is available, a determination 920 may be made as to whether a job exists for the connection point. If it is determined 920 that a job does not exist for the connection point, the highest priority job for any allowed connection point may again be determined 922. If, however, it is determined 920 that a job does exist for the connection point, the job may be assigned 910 to the agent, and the agent connection point cache may be updated 912.

In other words, an agent requesting work may use a different connection point than another agent, if possible. For example, if a first agent is already connected to a first connection point, and a second agent is able to use either the first connection point and a second connection point, when the second agent requests work, the second agent may be given work associated with the second connection point, if work exists for that connection point.

As previously stated, the present systems and methods may configure an application that processes mailboxes in an Exchange system. Applications processing data in Exchange mailboxes may be required to efficiently manage the configuration of application settings. For example, in an Exchange 2010 system, in particular with DAGs, the data may no longer be tied to a specific mailbox server. As a result, a mailbox server may not be an effective configuration point for the application. Instead, as the application is targeting the Exchange data, a mailbox database may be a more efficient configuration point for the application.

In a large organization (or a hosting company), however, there may be a large number of mailbox databases. This may require an extensive amount of time and resources to manage the system. As a result, the present systems and methods may use a group of databases as a configuration point for the application instead of individual mailbox databases. A group of databases may include any number of databases. In one embodiment, the databases within a group may be hosted on different servers, in different DAGs, etc.

In one embodiment, groups of databases may allow application settings and resources, such as maintenance, worker processors, etc., to be set against the data rather than the physical server, and may ensure that the data are processed at the appropriate time regardless if the data are active, and to finely tune the performance of the application. By grouping databases, the present systems and methods may reduce the number of places an administrator may be required to configure settings of the application.

In one embodiment, the application may define a default 'all other databases group', such that any database not defined in a group may be part of the default group. The application may determine if there are any mailboxes that will not be processed by the existing groups. The databases that include these mailboxes may be added to the 'all other databases group'.

Figure 10:
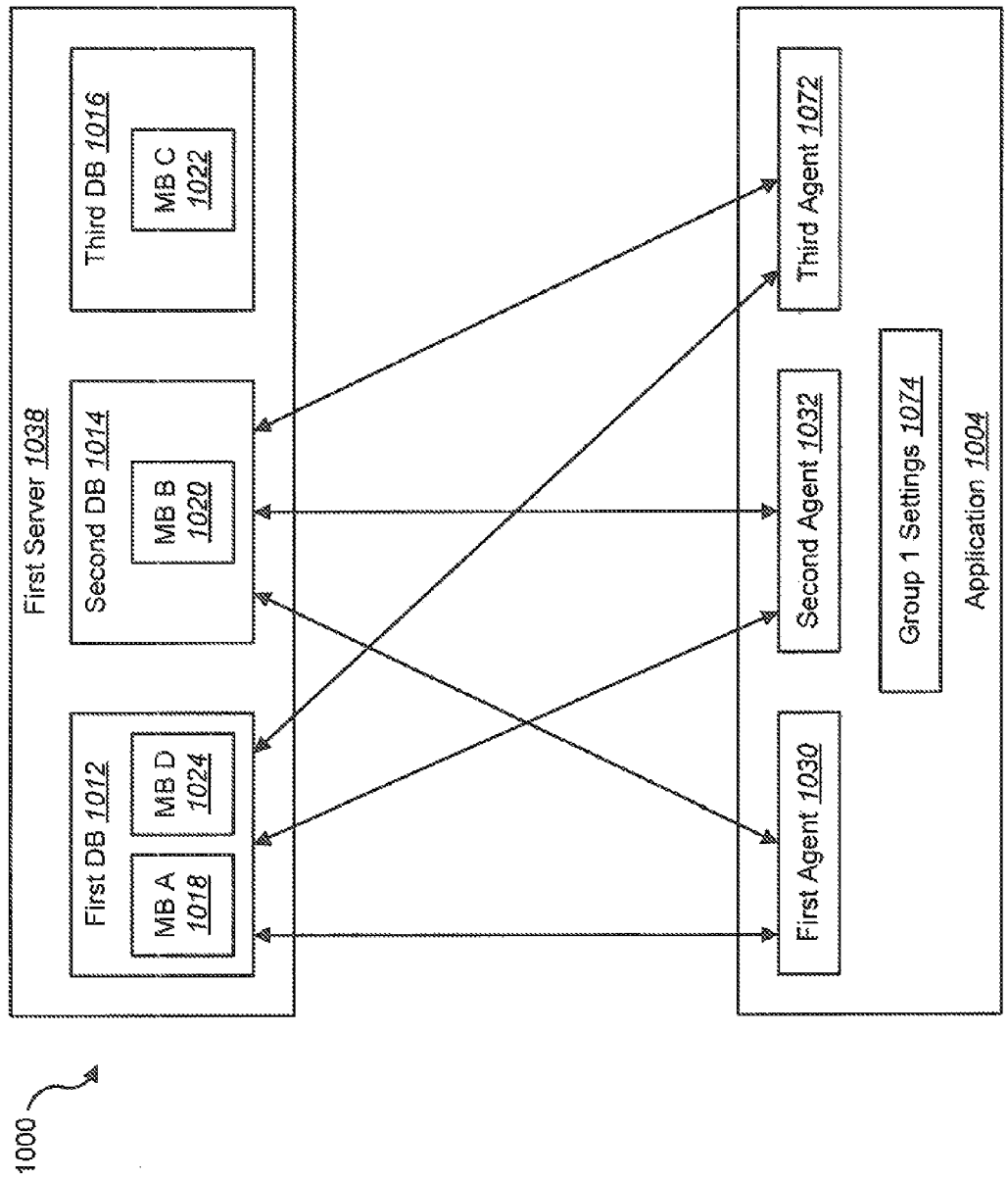
FIG. 10 is a block diagram illustrating another embodiment of an Exchange system in accordance with the present systems and methods.

FIG. 10 is a block diagram illustrating one embodiment of an Exchange system 1000. In one configuration, an application 1004 may include a first agent 1030, a second agent 1032, and a third agent 1072. The agents 1030, 1032, 1072 may process various jobs for the application 1004. For example, the agents may process mailbox data, where the mailboxes may be part of a mailbox database. The mailbox databases may be hosted on a mailbox server. For example, a first server 1038 may include a first database 1012, a second database 1014, and a third database 1016. Each database may include one or more mailboxes. For example, the first database 1012 may include mailbox A 1018 and mailbox D 1024. The second database 1014 may include mailbox B 1020, and the third database 1016 may include mailbox C 1022.

The application 1004 may also include group 1 settings 1074, which may indicate the configuration of the application 1004 in order to indicate which databases are to be processed or accessed, and which agents are to carry out the processes. For example, the group 1 settings 1074 may indicate that the application 1004 is configured to target mailbox A 1018, mailbox D 1024, mailbox B 1020, and mailbox C 1022. However, the group 1 settings 1074 may only include the first database 1012 and the second database 1014. As a result, the first agent 1030, the second agent 1032, and the third agent 1072 may only access the data within the first database 1012 and the second database 1014. As a result, mailbox C 1022 may not be processed with the current group 1 settings 1074.

Figure 11:
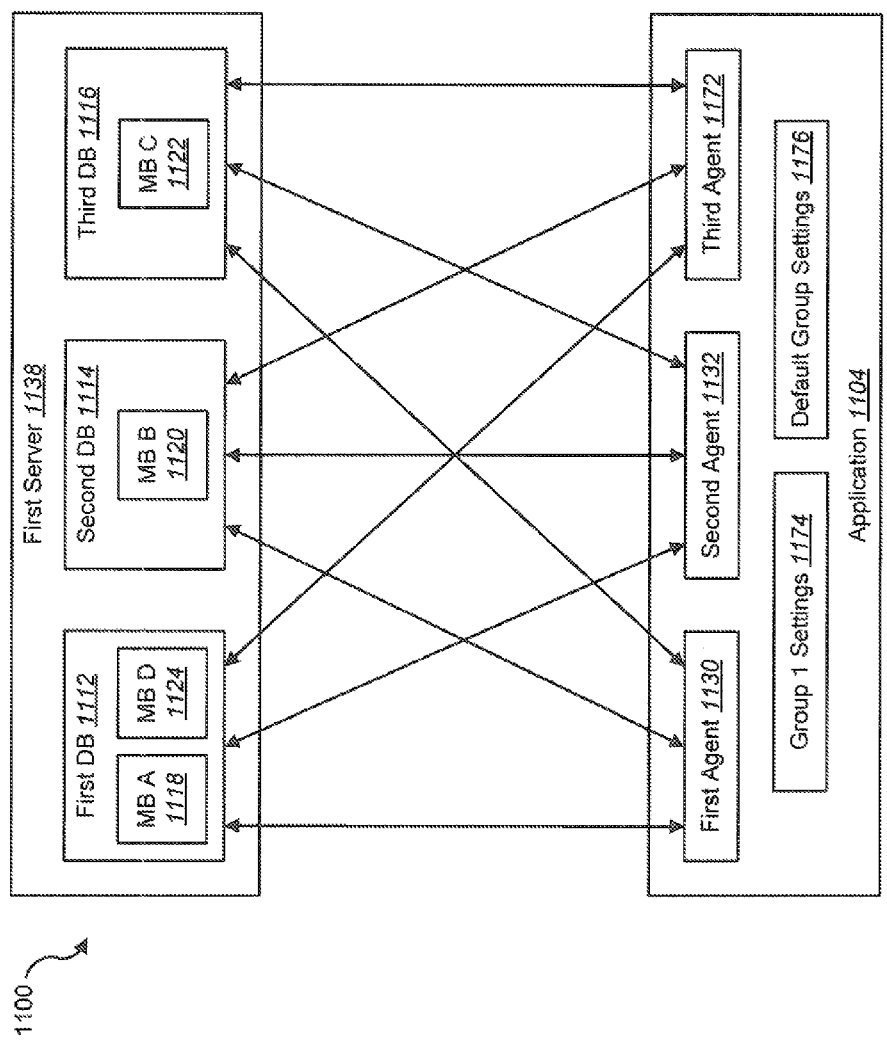
FIG. 11 is a block diagram illustrating one embodiment of an Exchange system for managing various databases as groups of databases.

FIG. 11 is a block diagram illustrating another embodiment of an Exchange system 1100 for organizing various databases into groups of databases. An application 1104 may include a first agent 1130, a second agent 1132, and a third agent 1172. The agents may process mailboxes within mailbox databases. In one embodiment, the databases may be hosted on a mailbox server. For example, a first server 1138 may host a first database 1112, a second database 1114, and a third database 1116. Each database may include one or more mailboxes. For example, the first database 1112 may include mailbox A 1118 and mailbox D 1124. The second database 1114 may include mailbox B 1120, and the third database 1116 may include mailbox C 1122.

As previously described in FIG. 10, the application 1104 may include group 1 settings 1174 that may indicate the configurations of the application 1104. For example, the group 1 settings 1174 may indicate that each agent 1130, 1132, 1172 may complete or process various jobs assigned by the application 1104. The group 1 settings 1174 may also indicate which databases are members of a group 1 of databases. For example, the settings 1174 may indicate that the first database 1112 and the second database 1114 are a part of group 1. As a result, the third database 1116 may not be included in the group 1 settings 1174. In other words, mailbox C 1122 may not be processed by any of the agents because the third database 1116 is not included as a member of group 1. In one embodiment, default group settings 1176 may also be included on the application 1104. The default group settings 1176 may identify databases that have not been assigned to a particular group. As a result, the third database 1116 may be a member of a default group indicated by the default group settings 1176. The default group settings 1176 may also indicate that each agent 1130, 1132, 1172 is authorized to process mailboxes within databases that belong to the default group. This may allow processing of mailbox C 1122 by any of the agents 1130, 1132, 1172. As shown in FIG. 11, any of the agents 1130, 1132, 1172 may process mailboxes that belong to either the group 1 of databases or the default group of databases.

Figure 12:
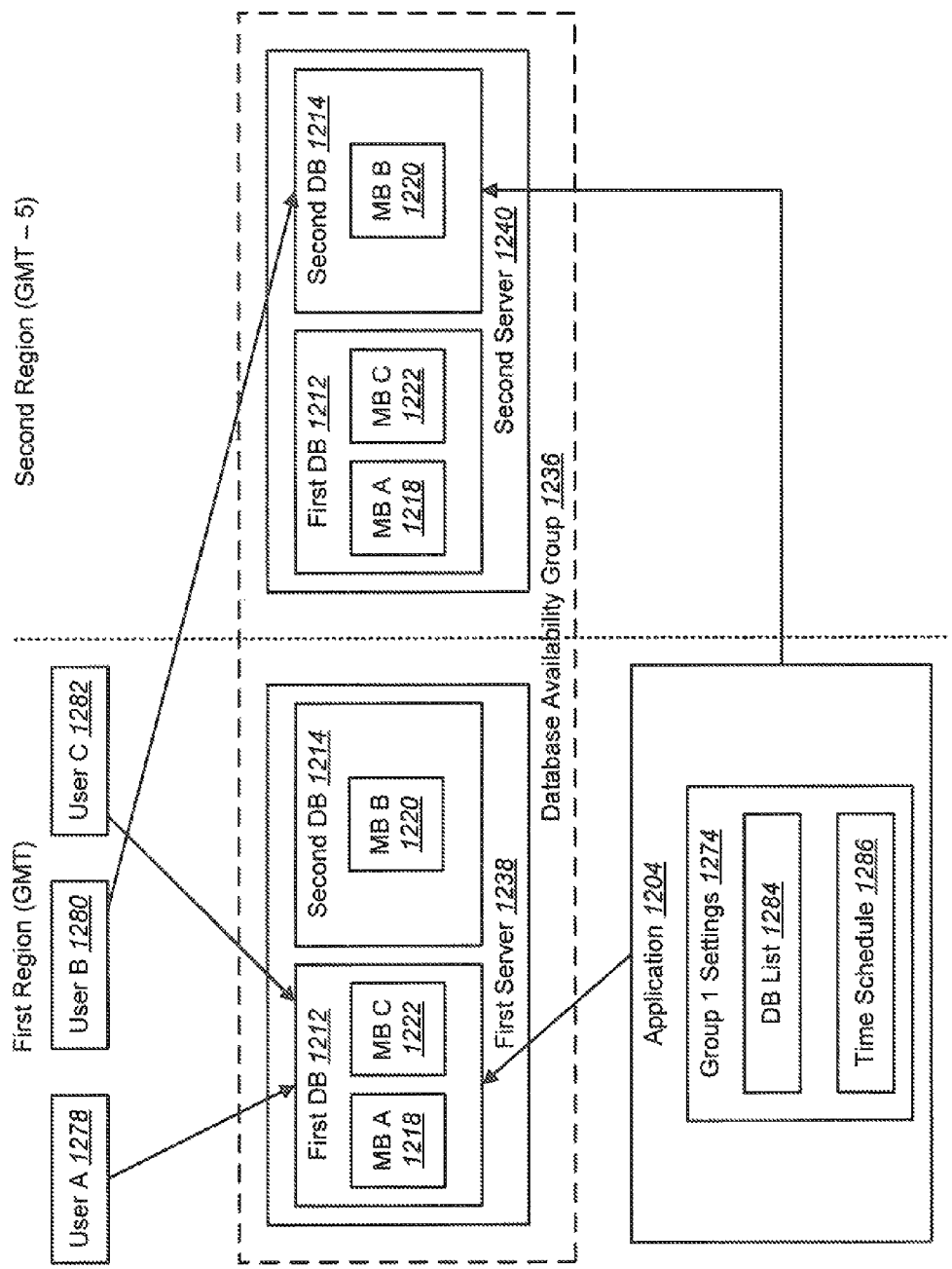
FIG. 12 is a block diagram illustrating another embodiment of an Exchange system in which a database availability group may exist.

FIG. 12 is a block diagram illustrating another embodiment of an Exchange system in which a database availability group 1236 may exist. In one embodiment, the DAG 1236 may include a first server 1238 located at a first region and a second server 1240 located at a second region. In one configuration, the first region may be in a Greenwich Mean Time (GMT) zone while the second region may be in a GMT-5 zone. In other words, the time zone of the second region may be five hours behind the time zone of the first region.

In one example, various users may desire to access mailboxes within mailbox databases hosted by the first server 1238 and the second server 1240. For example, user A 1278, user B 1280, and user C 1282 may desire to access the mailboxes within the first database 1212 and the second database 1214. The users 1278, 1280, 1282 may be located at the first region. An application 1204 may include group 1 settings 1274. In one embodiment, the group 1 settings 1274 may include a database list 1284 and a time schedule 1286. The database list 1284 may indicate which databases are members of a group 1 of databases. The time schedule 1286 may indicate a maintenance period or window for when agents (not shown) are allowed to process the various mailboxes being targeted. For example, the first database 1212 and the second database 1214 may be included on the database list 1284 (i.e., the first database 1212 and the second database 1214 are members of group 1). The time schedule 1286 may indicate a GMT zone. In other words, mailboxes within databases that belong to the group 1 of databases may only be processed during a specific time window according to the GMT zone.

In one example, user A 1278 and user C 1282 may access the first database 1212 at the first region. User B 1280 may access the second database 1214 located at the second region. Because the first database 1212 and the second database 1214 are both included in the group 1 settings 1274, the application 1204 may process or access the first database 1212 and the second database 1214 according to the GMT zone. In other words, even though the application 1204 is accessing the second database 1214 at the second region, the second database 1214 at the second region may only be accessed by the application 1204 during the same maintenance period as the first database 1212 at the first region. Group 1 may have its own maintenance period indicating that mailboxes within each mailbox database of group 1 may only be processed, for example, between midnight and 5:00 a.m. Even if the mailbox databases failover to a different server (such as the second database 1214 failing over to the second server 1240), the same maintenance window may still be applied. As a result, the mailboxes may not be processed by the application 1214 when the end users 1278, 1280, 1282 also want access to the mailboxes.

Figure 13:
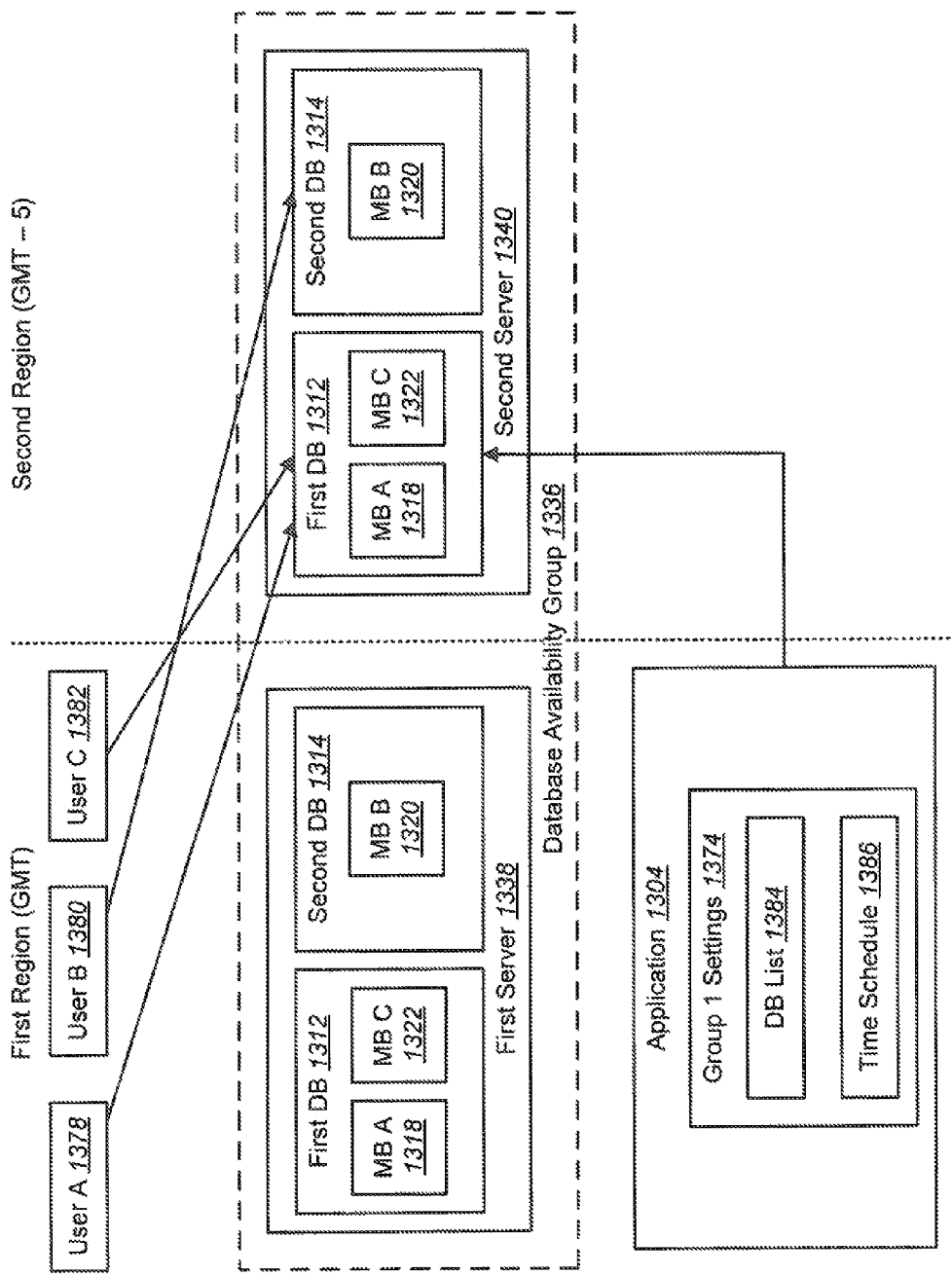
FIG. 13 is a block diagram illustrating another embodiment of an Exchange system in which a server in a region has failed.

FIG. 13 is a block diagram illustrating another embodiment of an Exchange system in which a first server 1338 at a first region has failed. For example, the first server 1338 may fail and, as a result, a first database 1312 and a second database 1314 hosted by the first server 1338 may not be accessible. Copies of the first database 1312 and the second database 1314 hosted by a second server 1340 at a second region may become active. The first server 1338 and the second server 1340 may be part of a database availability group 1336.

In one configuration, users 1378, 1380, 1382 desiring to access the first database 1312 and the second database 1314 may be located at the first region (while the active copies of the first database 1312 and the second database 1314 are now located at the second region, on the second server 1340). An application 1304 may also be located at the first region and may include group 1 settings 1374. As previously described, the group 1 settings 1374 may include a database list 1384 that may include a list of databases that are a part of group 1. The group 1 settings 1374 may also include a time schedule 1386 which may indicate which time zone to use when the application 1304 wishes to perform maintenance or processes on mailboxes 1318, 1320, 1322 hosted by the first database 1312 and the second database 1314. In one example, the first region may be in the GMT zone while the second region may be in a GMT-5 zone. The time schedule 1386 may indicate a maintenance period for the mailboxes according to the GMT zone. The maintenance period indicated by the time schedule 1386 may be a period of time when the users 1378, 1380, 1382 are not accessing the mailboxes. For example, the maintenance period may be from 12:00 am to 5:00 am according to the GMT zone.

In one embodiment, when the first database 1312 failsover to the second server 1340, the group 1 settings 1374 indicate that mailboxes 1318, 1322 within the first database 1312 may still be processed by the application 1304 during the period indicated by the time schedule 1386. In other words, the application 1304 may process the mailboxes 1318, 1322 during a time when the users 1378, 1380, 1382 are not accessing the mailboxes.

Figure 14:
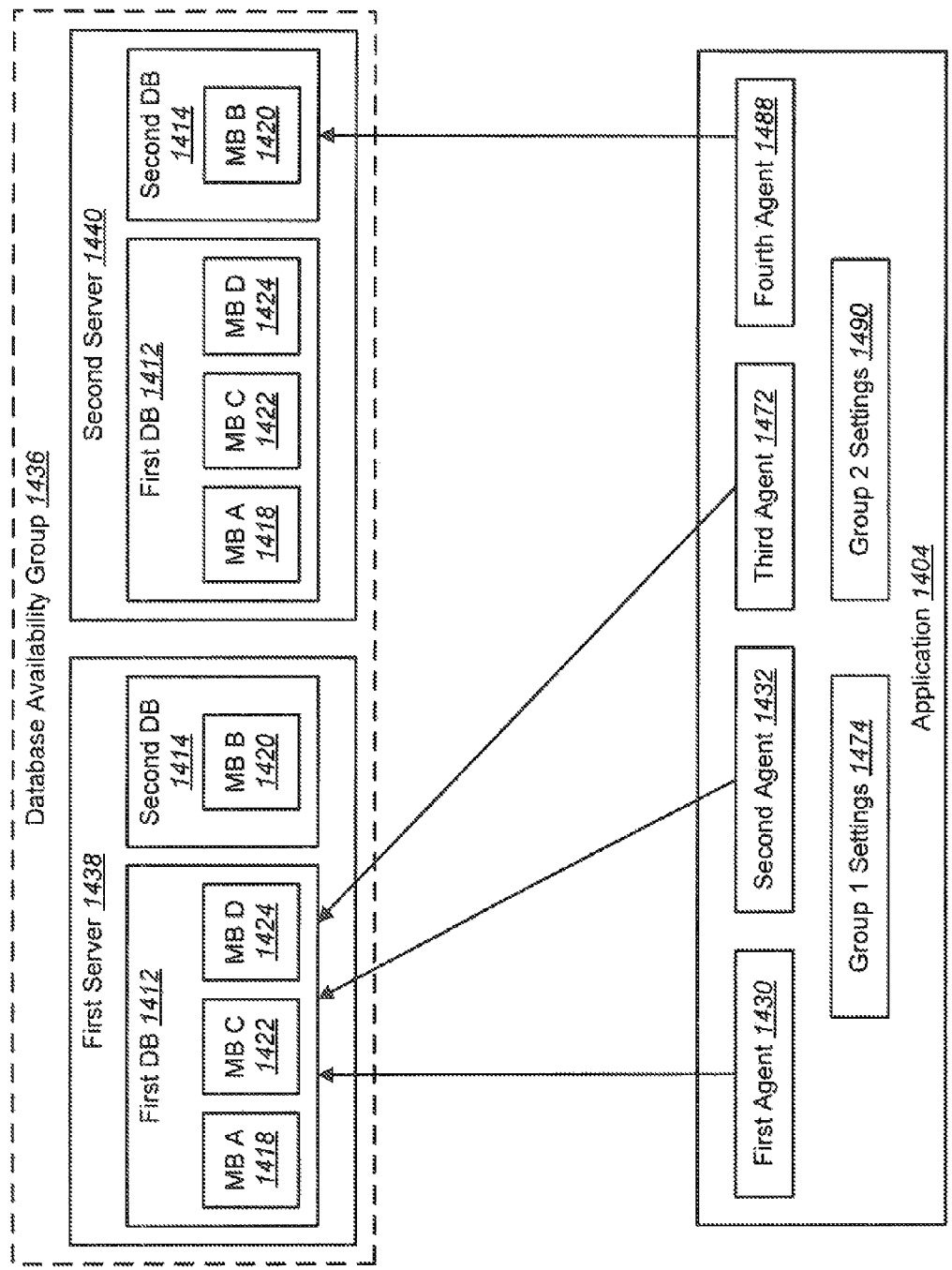
FIG. 14 is a block diagram illustrating one embodiment of an Exchange system managing groups of databases according to the size of the databases.

FIG. 14 is a block diagram illustrating one embodiment of an Exchange system managing groups of databases according to the size of the databases. In one example, a database availability group 1436 may include a first server 1438 and a second server 1440. Each server 1438, 1440 may include copies of a first database 1412 and a second database 1414. In one embodiment, the first database 1412 may be active on the first server 1438 and inactive on the second server 1440. Similarly, the second database 1414 may be inactive on the first server 1438 and active on the second server 1440.

In one configuration, each database 1412, 1414 may include one or more mailboxes. For example, the first database 1412 may include mailbox A 1418, mailbox C 1422, and mailbox D 1424. The second database 1414 may include mailbox B 1420. In other words, the first database 1412 may be significantly larger than the second database 1414. An application 1404 may include one or more agents to complete jobs or process the various mailboxes. For example, a first agent 1430, a second agent 1432, and a third agent 1472 may connect with the first database 1412 on the first server 1438 in order to process mailbox A 1418, mailbox C 1422, and mailbox D 1424. A fourth agent 1488 may connect with the second database 1414 on the second server 1440 in order to process mailbox B 1420. The application 1404 may include settings for various database groups. For example, group 1 settings 1474 may indicate that the first database 1412 is a member of group 1. Group 2 settings 1490 may indicate that the second database 1414 is a member of group 2. The group 1 settings 1474 may also indicate that the first agent 1430, the second agent 1432, and the third agent 1472 are dedicated agents for the first database 1412. The group 2 settings 1490 may indicate that only the fourth agent 1488 is the dedicated agent for the second database 1414. In other words, based on the group settings 1474, 1490, different numbers of agents may be dedicated to a particular database.

Figure 15:
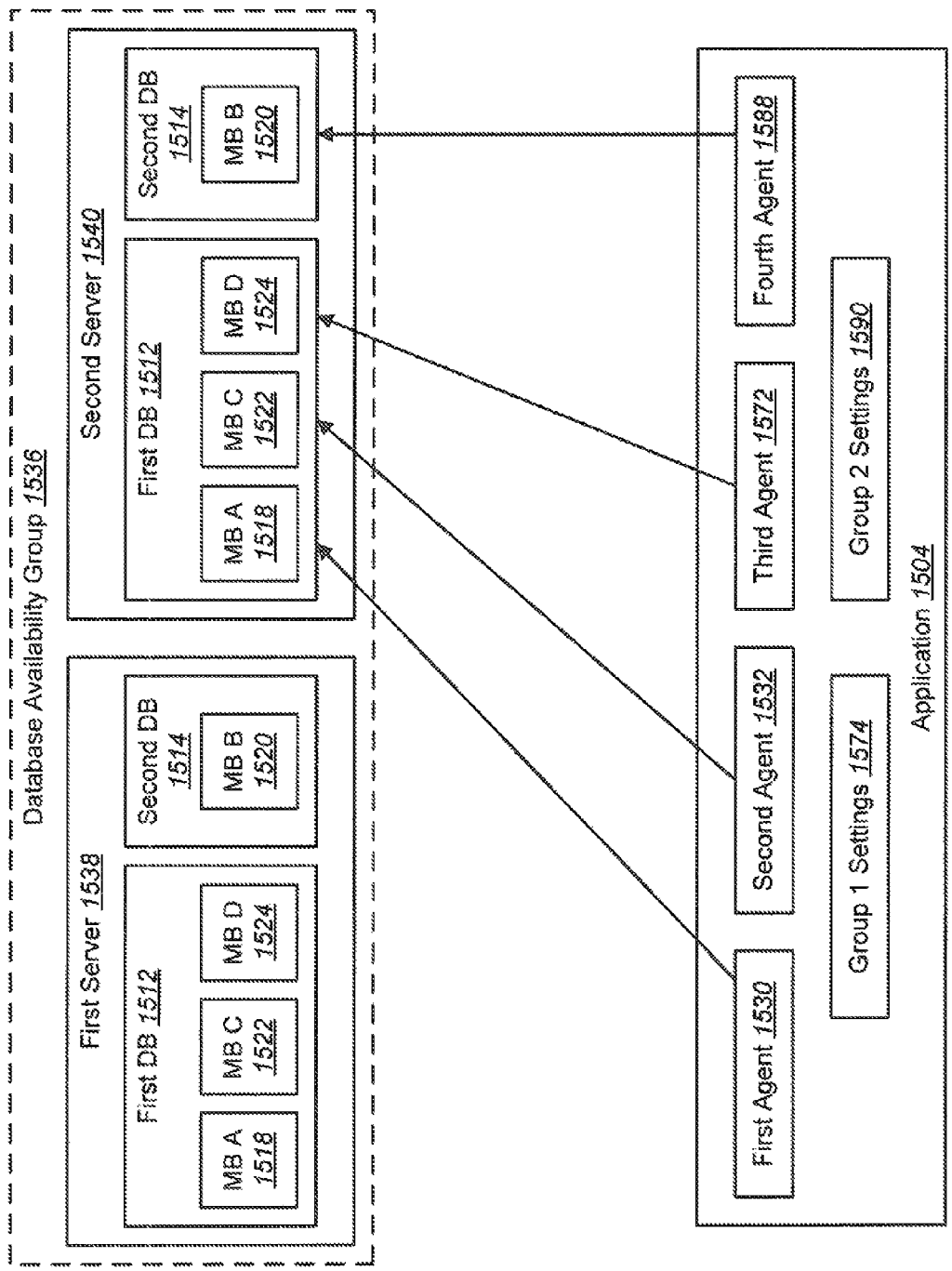
FIG. 15 is a block diagram illustrating one embodiment of a method for managing agents to process jobs after a failover of a server.

FIG. 15 is a block diagram illustrating one embodiment of an Exchange system managing agents that process jobs after the failure of a server. In one example, a database availability group 1536 may include a first server 1538 and a second server 1540. The first server 1538 may fail and, as a result, a first database 1512 and a second database 1514 hosted by the first server 1538 may be inaccessible. A second server 1540 may host copies of the first database 1512 and the second database 1514. When the first server 1538 fails, inactive copies of the databases 1512, 1514 hosted by the second server 1540 may become active. In other words, if the first database 1512 was active on the first server 1538 before the first server failed, the first database 1512 may become active on the second server 1540 after the failure of the first server 1538.

In one embodiment, an application 1504 may include various agents 1530, 1532, 1572, 1588 to process mailboxes within the first database 1512 and the second database 1514. Group 1 settings 1574 may indicate that the first database 1512 is a member of group 1 and the first agent 1530, the second agent 1532, and the third agent 1572 are dedicated agents for the first database 1512. Group 2 settings 1590 may indicate that the second database 1514 is a member of group 2 and only the fourth agent 1588 may be dedicated for the second database 1514. The group 1 settings 1574 may include more agents dedicated for the first database 1512 because the first database 1512 may include mailbox A 1518, mailbox C 1522, and mailbox D 1524, while the second database 1514 only contains mailbox B 1520.

As explained above, if a mailbox database is particularly large (such as the first database 1538), the database may be the sole member of a database group. The group may have a number of agents dedicated to processing the targets, or mailboxes, in the large database in order to ensure that the work is done inside a particular maintenance window. Other mailbox databases may be processed by different agents and the work load may be distributed.

Figure 16:
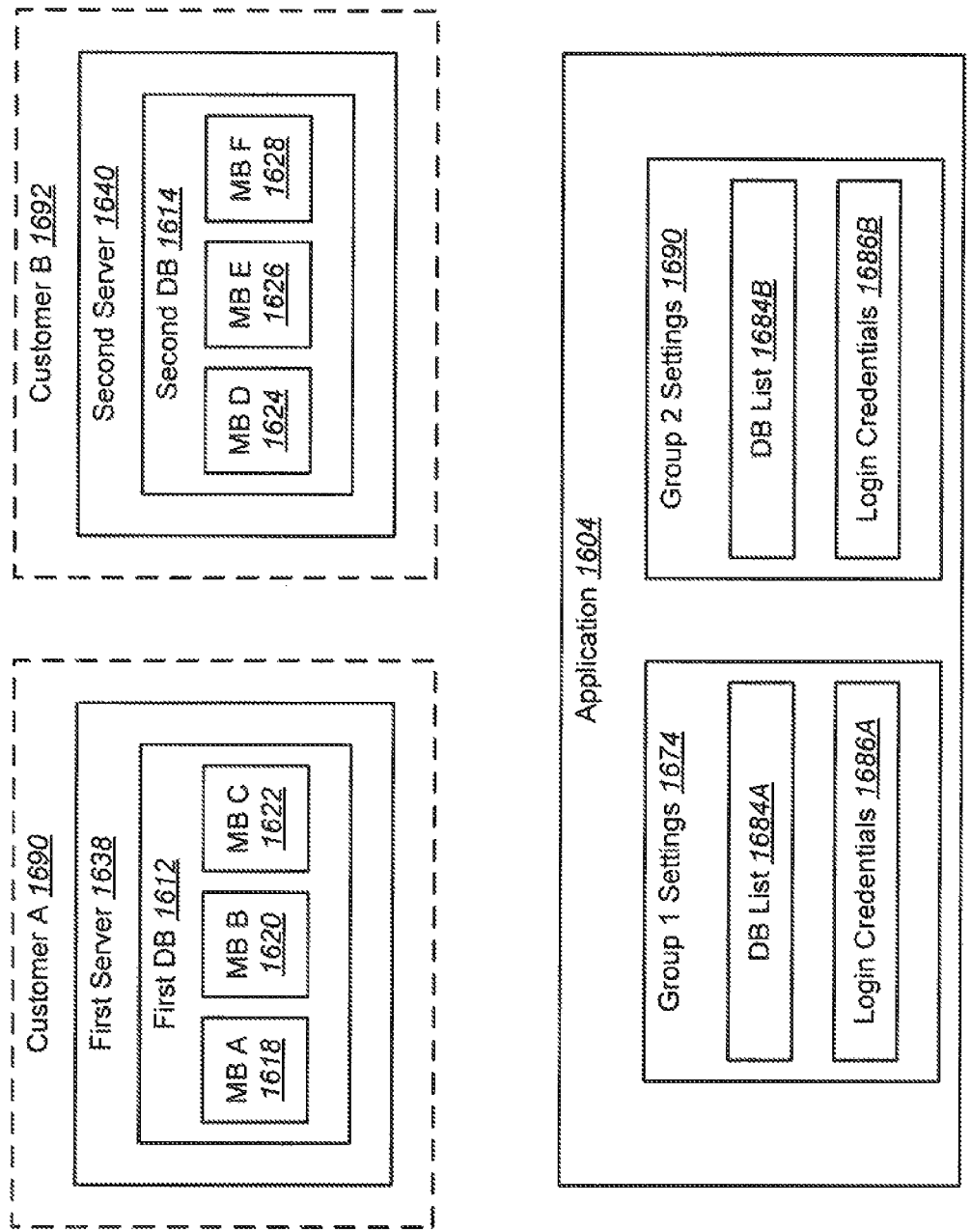
FIG. 16 is a block diagram illustrating another embodiment of managing the processing of mailboxes by organizing database into various database groups.

FIG. 16 is a block diagram illustrating another embodiment of an Exchange system managing the processing of mailboxes by organizing databases into various database groups. As explained above, the association of data to agents may allow for an application 1604 to use different credentials for different data by assigning agents to run as specific accounts.

In one embodiment, customer A 1690 and customer B 1692 may be associated with a particular server and mailbox database hosted by a server. For example, customer A 1690 may be associated with a first server 1638 which hosts a first database 1612. Customer B 1692 may be associated with a second server 1640 which hosts a second database 1614. Each customer 1690, 1692 may be associated with mailboxes in a mailbox database 1612, 1614. Each database 1612, 1614 may have its own administrator credential. For example, customer A 1690 may be associated with mailbox A 1618, mailbox B 1620, and mailbox C 1622. Customer B 1692 may be associated with mailbox D 1624, mailbox E 1626, and mailbox F 1628. The application 1604 may include settings for two different groups of databases. For example, group 1 settings 1674 may include a database list 1684A that lists the databases that are a member of group 1. Group 2 settings 1690 may also include a database list 1694B that lists databases that are a member of group 2. These two mailbox database groups may be created to target the mailboxes of the two customers 1690, 1692. Each mailbox database group may include its own login credentials 1686A, 1686B to ensure that agents (not shown) may only process mailboxes from a particular customer's mailbox database.

From the above description, it may be possible to end up in a situation where a number of mailboxes may not be processed by any agents. For example, if the application 1604 includes settings for a single database group, and no default group settings exist, mailboxes may exist in a mailbox database that is not a member of the database group. In one configuration, these mailboxes may not be processed. In one example, an administrator may either add an 'all other databases' group or place the mailbox database in an existing group. To notify an administrator if this situation has occurred, the application 1604 may analyze the target mailboxes and groups, and determine if there are any target mailboxes that will not be processed. An alert may be generated if there are targeted mailboxes that will not be processed. The alert may be an event in an event log, an e-mail, or some other notification. The administrator may then create an 'all other databases' group. The databases that are not a member of a group may become members of the 'all other databases' group. Targeted mailboxes associated with these databases may be processed.

In one embodiment, the application may be able to scan an Exchange system that is being targeted and automatically create a number of database groups based on the current system resources and configurations. For example, the application 1604 may scan the system and create groups based on the geographical regions, data centers where the Exchange servers exist, etc. In another embodiment, a group may be created for each Exchange server that includes the mailbox databases included in that Exchange server. Each group may also be assigned sufficient agents based on the amount of target mailboxes in the mailbox databases. In the case of a failover, the application resources may still be evenly spread so that the performance is not degraded.

In another embodiment, the application 1604 may also assist with automatic group generation by examining the Exchange environment and determining the optimal way of grouping the databases for application configuration settings. For example, if the Exchange servers are distributed across active directory sites, the databases may be grouped such that each site has its own group. This may allow the application to then configure agents in each site in order to process the data and reduce traffic on the WAN. If the Exchange system is being backed up by a third party application, the application 1604 may clear a third party application for its back-up window and ensure groups are created so that the application only processes databases outside the back-up windows. These groups may then have schedules automatically applied based on the available window. For example, if the back-up application is processing a first mailbox database 1612 and a second mailbox database 1614 from 1:00 a.m. to 3:00 a.m. and a third mailbox database and a fourth mailbox database from 3:00 a.m. to 5:00 a.m., then the application 1604 may automatically configure a first group including the first and second mailbox databases 1612, 1614 and schedule those to be processed from 4:00 a.m. to 7:00 a.m. The application 1604 may create a second group, including the third and fourth databases and schedule those to be processed from 5:00 a.m. to 6:00 a.m. The length of the schedules may be determined by examining either the number of mailboxes in the databases or the current size of the databases.

In one embodiment, an application user interface may allow the administrator to manually create groups by selecting mailbox databases to be added to a group by using a wizard. This may allow the selection of mailbox databases by name, by the mailbox server currently hosting the active copy of the database, or by specifying an active directory query to search for databases on other active directory attributes. The user interface may also include the option of analyzing the target data and assigning mailbox databases to groups based on the resources available to that group. For example, if a first group includes databases containing a total of 5,000 mailboxes and a second group consists of databases containing 1,000 mailboxes, and both groups are assigned the same number of resources to process the data, then the application user interface may suggest, or automatically configure, a newly added database to be added to the second group.

Figure 17:
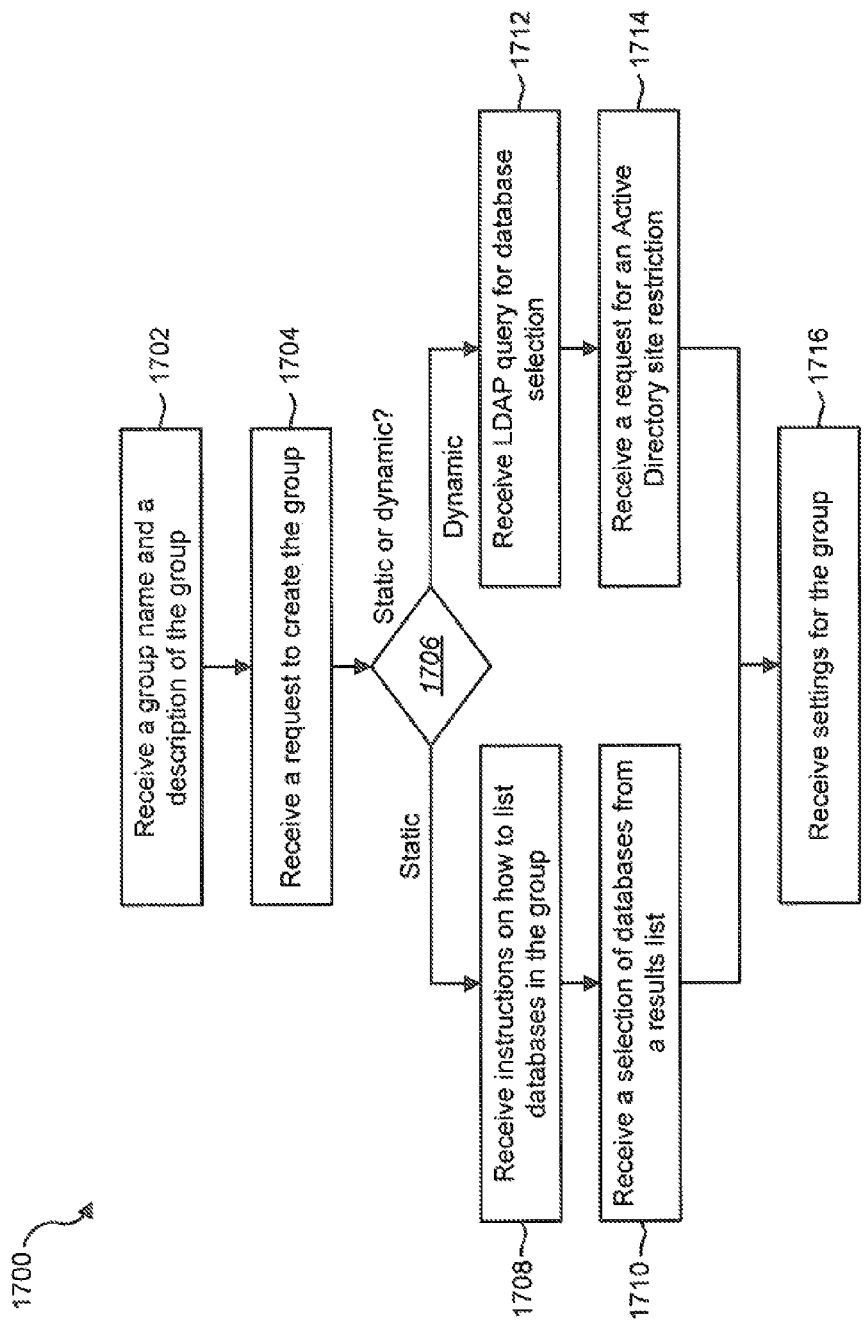
FIG. 17 is a flow diagram illustrating one embodiment of a method for creating a group of databases.

FIG. 17 is a flow diagram illustrating one embodiment of a method for creating a group of databases. In one embodiment, a group name and a description of the group may be received 1702. A request to create the group may also be received 1704. A determination 1706 may be made as to whether the group will be a static or dynamic group. If it is determined 1706 that the group will be a static group, instructions on how to list databases in the group may be received 1708. A selection of databases from a results list may also be received 1710 and settings for the group may be received 1716. If, however, it is determined 1706 that the group will be a dynamic group, lightweight directory access protocol (LDAP) queries for database selections may be received 1712. In one embodiment, the request for an active directory site restriction may also be received 1714. In one configuration, settings for the group may then be received 1716.

Figure 18:
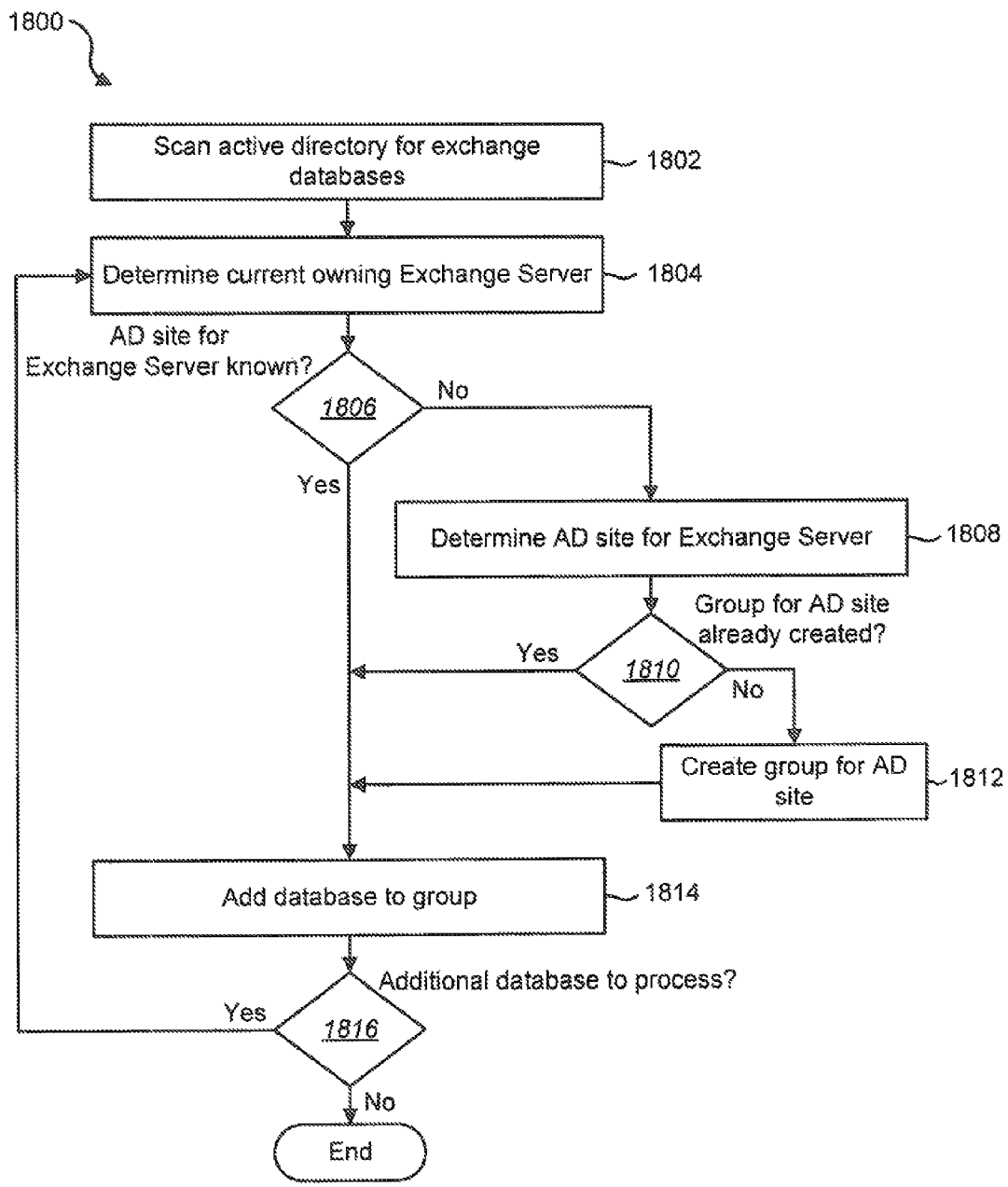
FIG. 18 is a flow diagram illustrating one embodiment of a method for adding databases to a group.

FIG. 18 is a flow diagram illustrating one embodiment of a method for adding databases to a group. In one configuration, an active directory may be scanned 1802 for exchange databases. The Exchange server currently owning the database may be determined 1804. A determination 1806 may be made as to whether an active directory site for an Exchange server is known. If it is determined 1806 that an active directory site for the Exchange server is known, the database may be added 1814 to the group for the active directory site. If, however, it is determined 1806 that an active directory site for the Exchange server is not known, the active directory site for the Exchange server may be determined 1808. In addition, a determination 1810 may be made as to whether a group for the active directory site has already been created. If it is determined 1810 that a group for the active directory site has already been created, the database may be added to the group 1814. If, however, it is determined 1810 that a group for the active directory site has not been created, a group for the active directory site may be created 1812, and the database may be added to the group 1814. A determination 1816 may be made as to whether additional databases exist to process. If it is determined 1816 that additional databases exist, the method 1800 may return to determine 1804 the Exchange server currently owning the additional database. If, however, it is determined 1816 that additional databases to process do not exist, the method 1800 may end.

Figure 19:
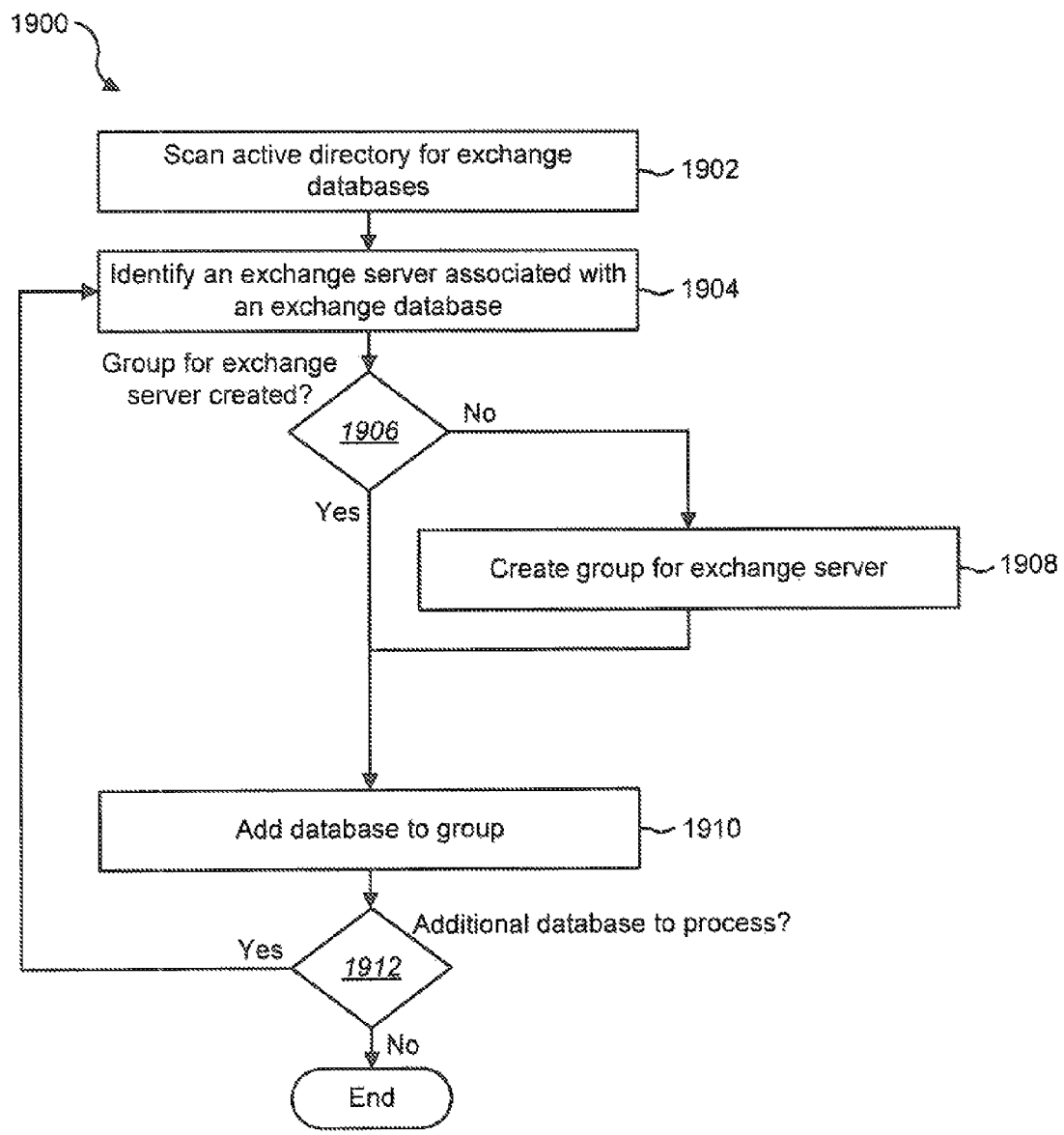
FIG. 19 is a flow diagram illustrating another embodiment of a method for adding a database to a group.

FIG. 19 is a flow diagram illustrating another embodiment of a method 1900 for adding a database to a group. In one example, an active directory may be scanned 1902 for Exchange databases. An Exchange server associated with an active Exchange database may be identified 1904. A determination 1906 may be made as to whether a group for the Exchange server has been created. If it is determined 1906 that a group for the Exchange server has been created, a database may be added 1910 to a group. If, however, it is determined 1906 that a group for the Exchange server has not been created, a group for the Exchange server may created 1908. The database may then be added 1910 to the group. A determination 1912 may be made as to whether additional databases exist to process. If it is determined 1912 that additional databases exist, the method 1900 may return to identify 1904 an Exchange server associated with an Exchange database. If, however, it is determined 1912 that additional databases do not exist, the method 1900 may end.

Figure 20:
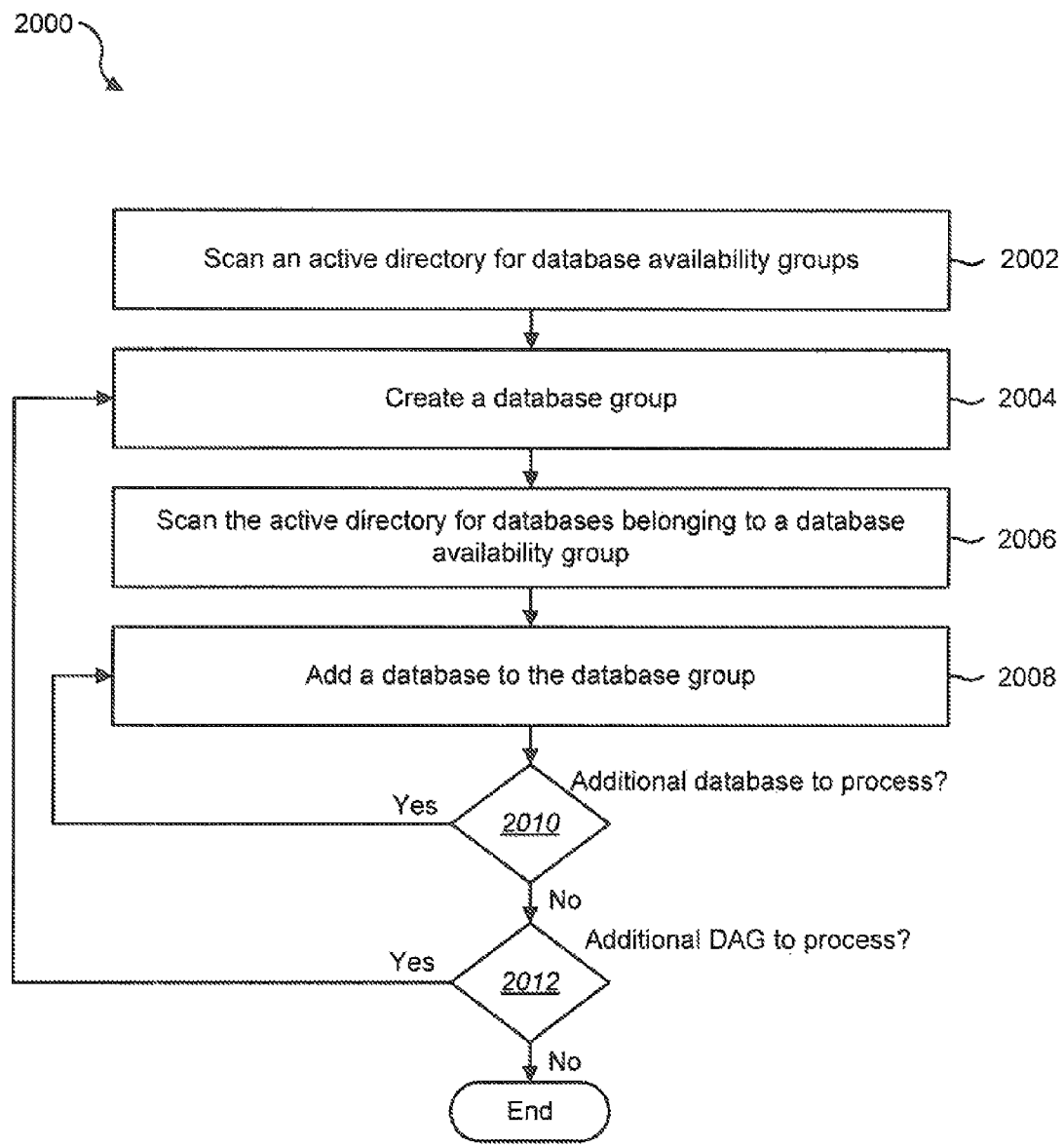
FIG. 20 is a flow diagram illustrating a further embodiment of a method for adding databases to a group.

FIG. 20 is a flow diagram illustrating a further embodiment of a method 2000 for adding databases to a group. In one embodiment, an active directory may be scanned 2002 for database availability groups (DAGs). A database group may be created 2004. The active directory may be scanned 2006 for databases belonging to a DAG. A database may be added 2008 to the database group, and a determination 2010 may be made as to whether additional databases exist to process. If it is determined 2010 that additional databases exist, the database may be added 2008 to the database group. If, however, it is determined 2010 that additional databases do not exist, a determination 2012 may exist as to whether additional DAGs exist to process. If it is determined 2012 that additional DAGs exist, a database group may be created 2004 and the steps of the method 2000 may be repeated as described above. If, however, it is determined 2012 that additional DAGs do not exist, the method 2000 may end.

Figure 21:
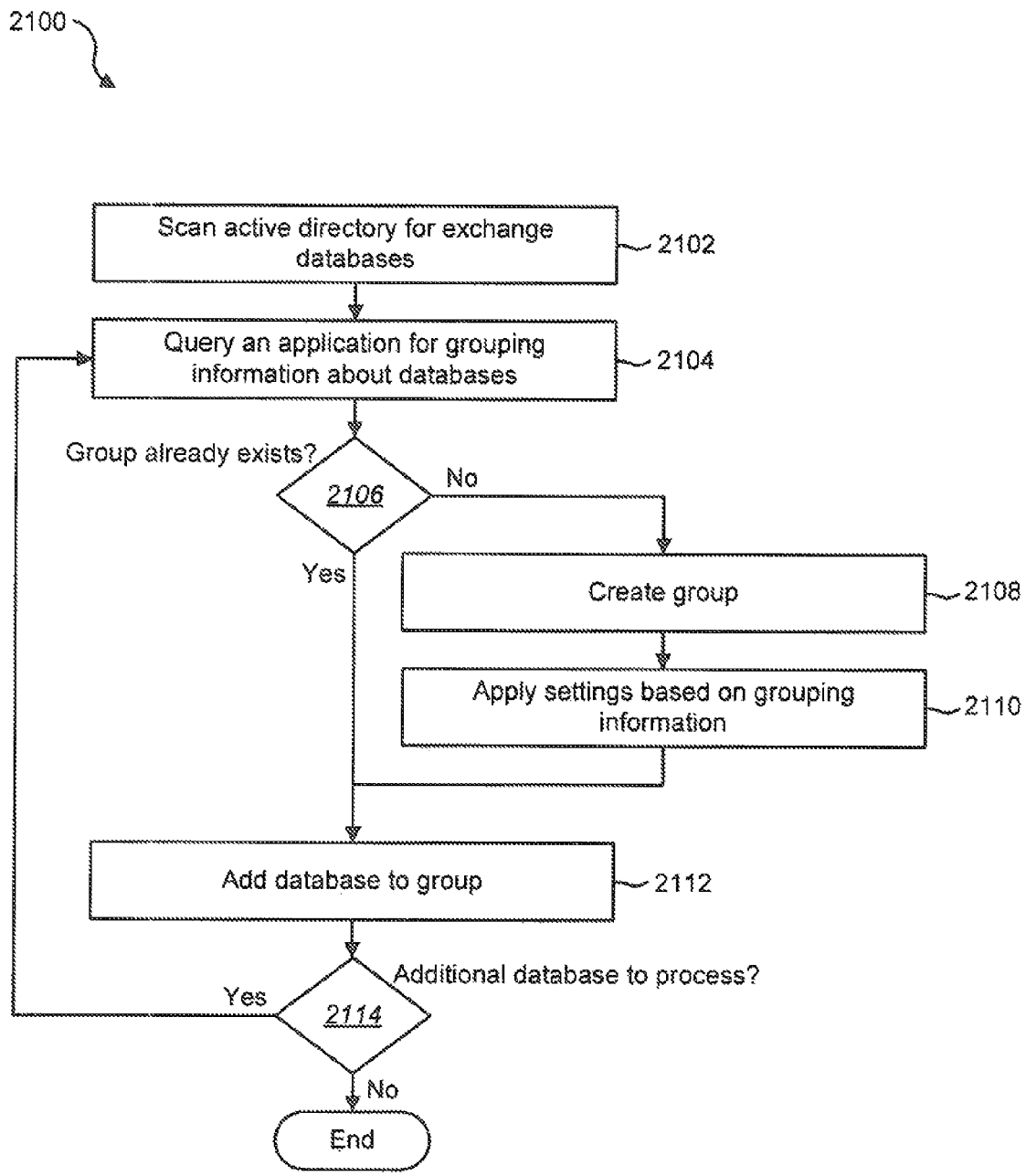
FIG. 21 is a flow diagram illustrating a further embodiment of method for adding a database to a group.

FIG. 21 is a flow diagram illustrating a further embodiment of a method 2100 for adding a database to a group. In one embodiment, an active directory may be scanned 2102 for Exchange databases. An application for grouping information about databases may be queried 2104. A determination 2106 may be made as to whether a group already exists. If it is determined 2106 that a group already exists, a database may be added 2112 to the group. If, however, it is determined 2106 that a group does not already exist, a group may be created 2108, and settings based on the grouping information may be applied 2110. The database may then be added 2112 to the group. A determination 2114 may be made as to whether additional databases exist to process. If it is determined 2114 that additional databases do exist, the method 2100 may return to query 2104 an application for grouping information about databases. The method 2100 may then continue as described above. If, however, it is determined 2114 that additional databases do not exist, the method 2100 may end.

Figure 22:
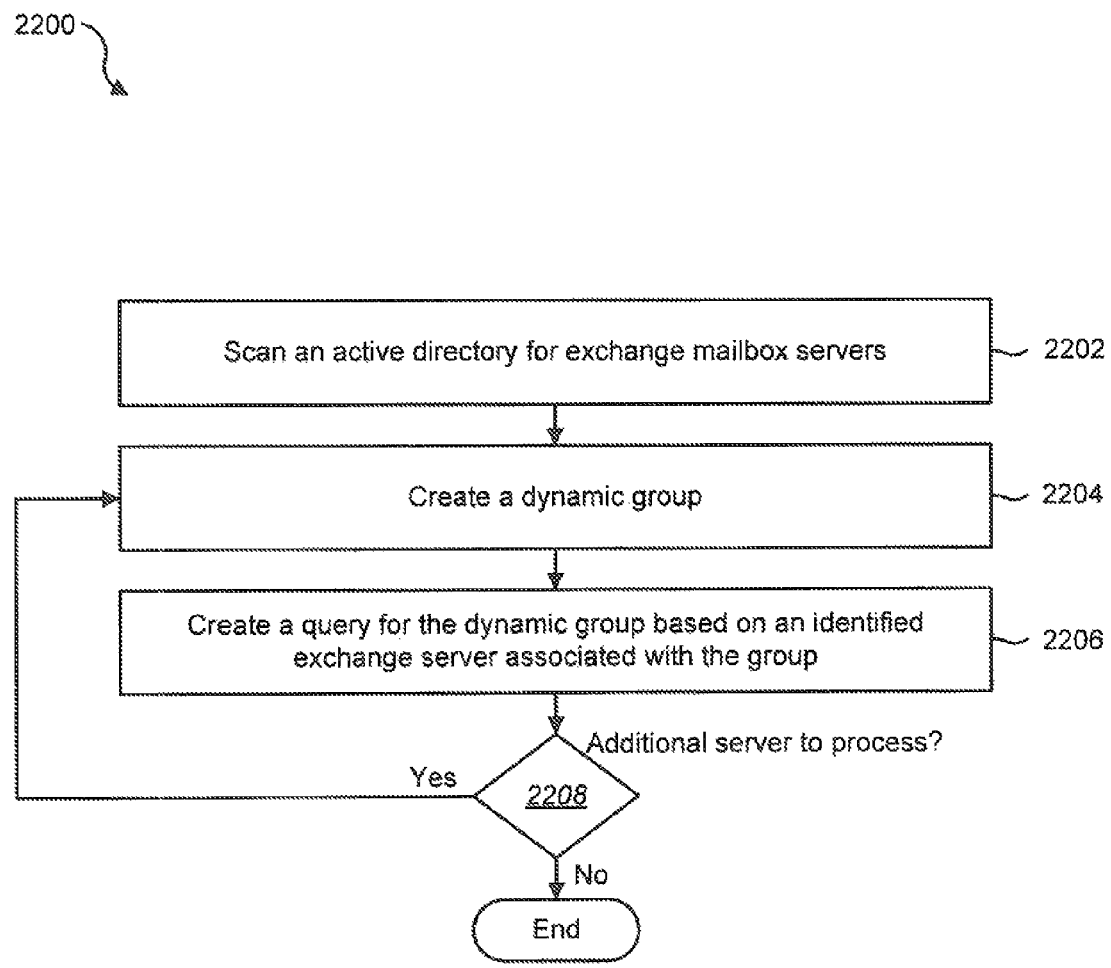
FIG. 22 is a flow diagram illustrating one embodiment of a method for creating a dynamic group of databases.

FIG. 22 is a flow diagram illustrating one embodiment of a method 2200 for creating a dynamic group of databases. In one embodiment, an active directory may be scanned 2202 for Exchange mailbox servers. A dynamic group may be created 2204. In one embodiment, a query for the dynamic group based on an identified Exchange server associated with the group may be created 2206. A determination 2208 may be made as to whether additional servers exist to process. If it is determined 2208 that additional servers exist, the method 2200 may return to create 2204 a dynamic group. The method 2200 may then continue as outlined above. If, however, it is determined that additional servers do not exist, the method 2200 may end.

Figure 23:
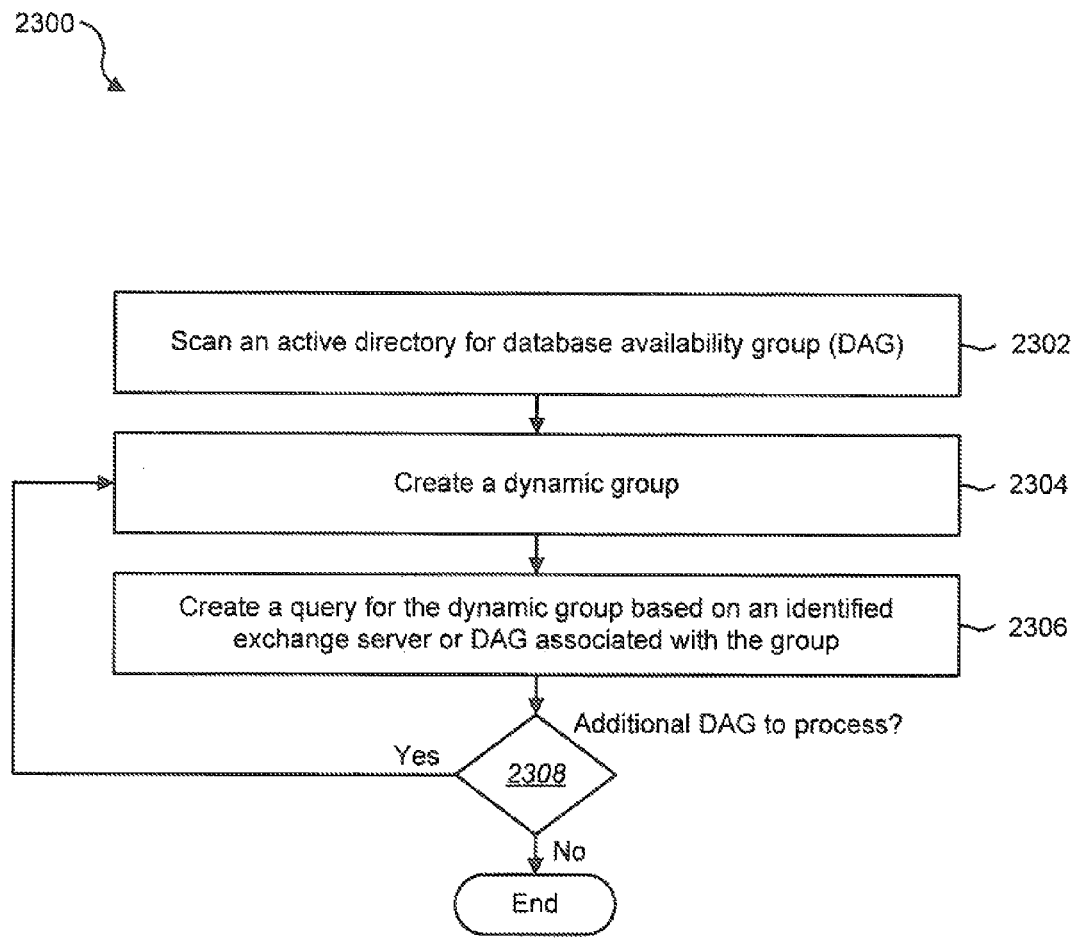
FIG. 23 is a flow diagram illustrating a further embodiment of a method for creating a dynamic group of databases.

FIG. 23 is a flow diagram illustrating a further embodiment of a method 2300 for creating a dynamic group of databases. In one configuration, an active directory may be scanned 2302 for DAGs. A dynamic group may be created 2304. A query for the dynamic group may be created 2306. In one embodiment, the query may be based on an identified Exchange server or DAG associated with the group. A determination 2308 may be made as to whether additional DAGs exist. If it is determined 2308 that an additional DAG exits, the method 2300 may return to create 2304 a dynamic group. The method 2300 may then continue as outlined above. If, however, it is determined that additional DAGs do not exist, the method 2300 may end.

Figure 24:
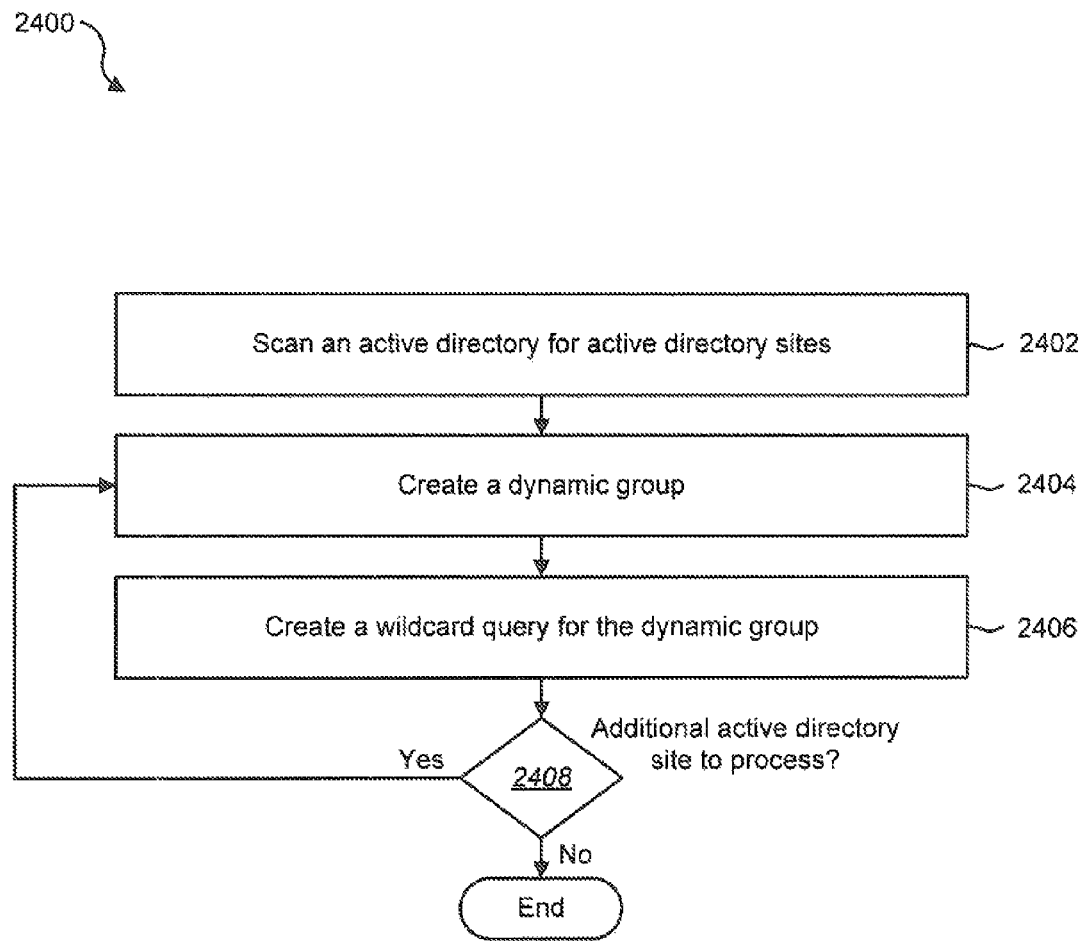
FIG. 24 is a flow diagram illustrating a further embodiment of creating a dynamic group of databases.

FIG. 24 is a flow diagram illustrating a further embodiment of creating a dynamic group of databases. In one embodiment, an active directory may be scanned 2402 for active directory sites. A dynamic group may be created 2404. In one embodiment, a wild card query made for the dynamic group may be created 2406. A determination 2408 may be made as to whether additional active directory sites exist to process. If it is determined 2408 that additional active directory sites do exist, the method 2400 may return to create 2404 a dynamic group. The method 2400 may then continue as outlined above. If, however, it is determined 2408 that additional active directory sites do not exist, the method 2400 may end.

Figure 25:
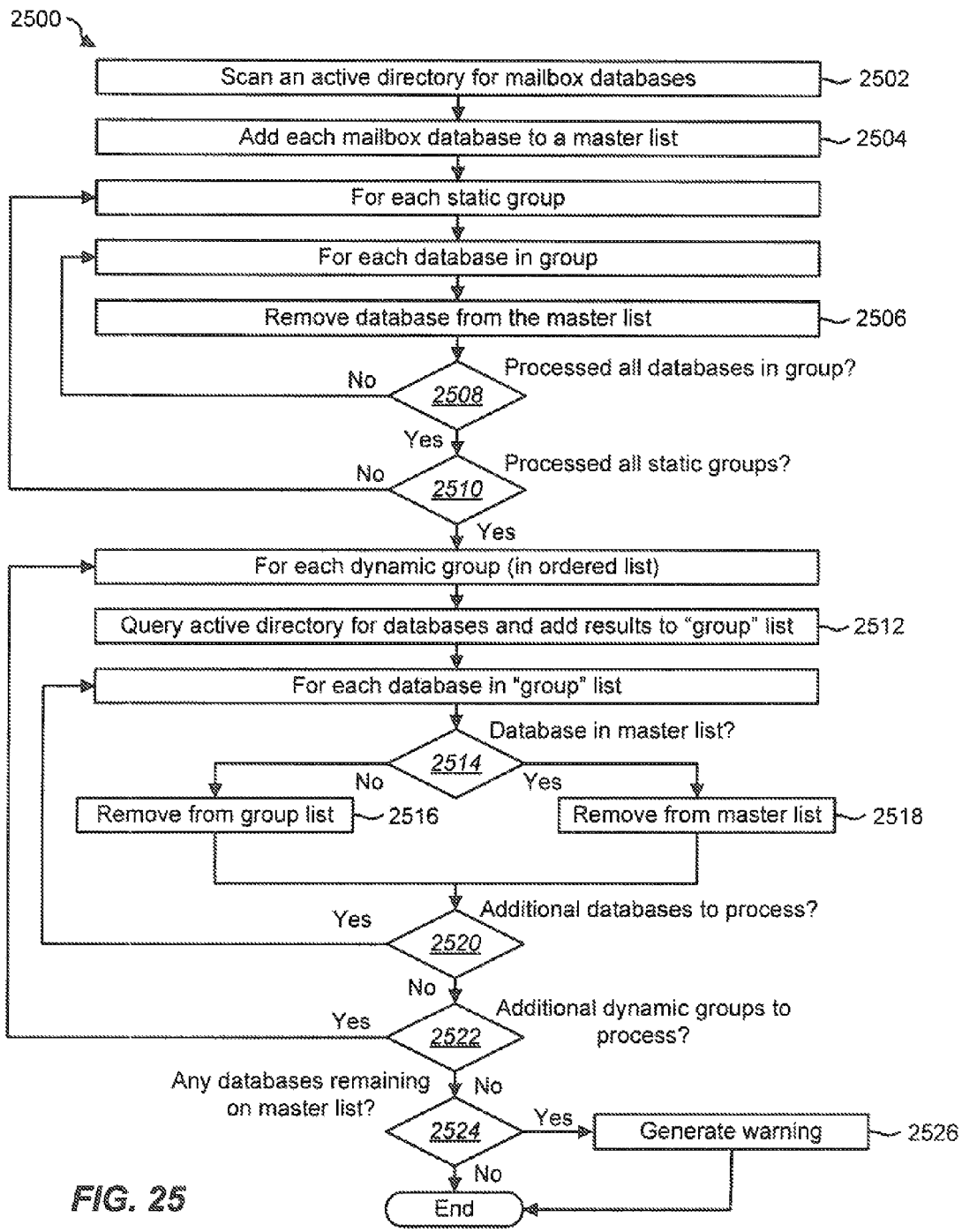
FIG. 25 is a flow diagram illustrating one embodiment of a method for determining membership of dynamic groups.

FIG. 25 is a flow diagram illustrating one embodiment of a method 2500 for determining membership of dynamic groups. In one configuration, an active directory may be scanned 2502 for mailbox databases. Each mailbox database discovered from the scan may be added 2504 to a master list. A first mailbox database belonging to a first static group may be removed 2506 from the master list. A determination 2508 may be made as to whether all the mailbox databases in the first static group have been processed. If it is determined 2508 that not all of the mailbox databases within the first static group have been processed, the method 2500 may return to remove 2506, for example, a second mailbox database belonging to the first static group from the master list. This may continue until it is determined 2508 that all the mailbox databases belonging to the first static group have been processed.

After all of the mailbox databases belonging to a static group, such as the first static group, a determination 2510 made be made as to whether all the static groups have been processed. If it is determined 2510 that not all of the static groups have been processed, the method 2500 may return to remove 2506 a first mailbox database belonging to, for example, a second static group, from the master list. The method 2500 may then continue to process and remove all the mailbox databases belonging to the second static group until it is determined 2508 that all the mailbox databases belonging to the second static group have been processed. The above-mentioned steps may continue for each static group and for each mailbox database belonging to a static group.

Once each static group (and the mailbox databases belonging to a static group) have been processed, an active directory query of a dynamic group, such as a first dynamic group, may be queried 2512 for databases. The databases discovered from the query may be added to a group list for the first dynamic group. A first database added to the group list may be processed in order to determine 2514 whether the first database is included in the master list. If the first database is included in the master list, the first database may be removed 2518 from the master list. If, however, the first database is not included in the master list, the first database may be removed 2516 from the group list. A determination 2520 may then be made as to whether there are additional databases to process. If there are additional databases to process from the first dynamic group, a second database, for example, may be processed to determine 2514 whether the second database is included in the master list. The steps described above may then repeat until each database belonging to the first dynamic group have been processed.

When each database belonging to the first dynamic group has been processed, a determination 2522 may be made as to whether there are additional dynamic groups to process. If it is determined that there are additional dynamic groups, such as a second dynamic group, to process, the method 2500 may return to process/execute 2512 an active directory query of the second dynamic group for databases. Databases discovered from the query of the active directory of the second dynamic group may be added to a group list, and the steps previously described may be repeated for each database belonging to the second dynamic group. These steps may repeat for each dynamic group (and each database belonging to a dynamic group) until each dynamic group has been processed.

After each dynamic group has been processed, a determination 2524 may be made as to whether any databases remain on the master list. If additional databases remain on the master list, a warning may be generated 2526. If, however, there are no databases remaining on the master list, the method 2500 may end.

Figure 26:
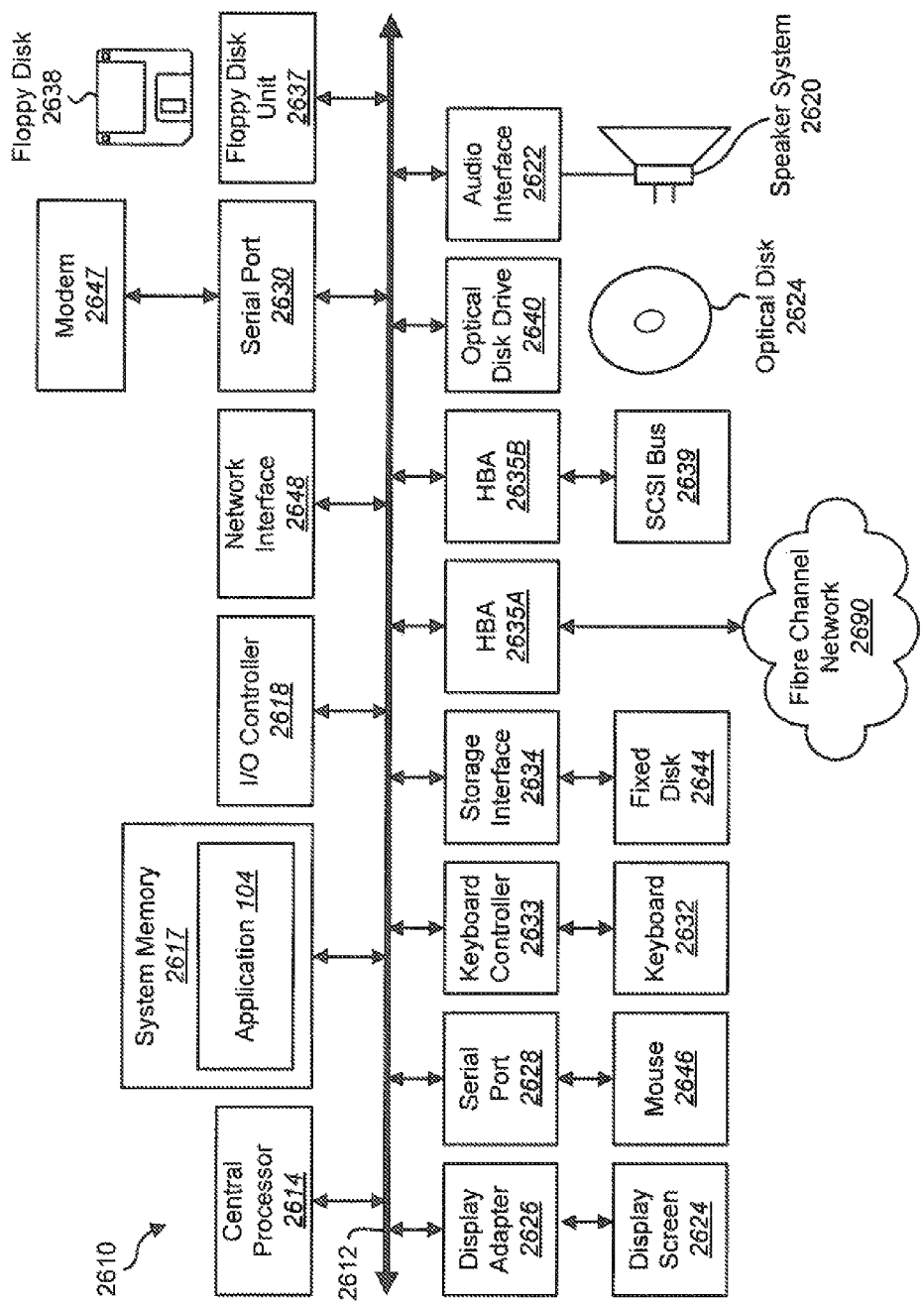
FIG. 26 depicts a block diagram of a computer system suitable for implementing the present systems and methods.

FIG. 26 depicts a block diagram of a computer system 2610 suitable for implementing the present systems and methods. Computer system 2610 includes a bus 2612 which interconnects major subsystems of computer system 2610, such as a central processor 2614, a system memory 2617 (typically RAM, but which may also include ROM, flash RAM, or the like), an input/output controller 2618, an external audio device, such as a speaker system 2620 via an audio output interface 2622, an external device, such as a display screen 2624 via display adapter 2626, serial ports 2628 and 2630, a keyboard 2632 (interfaced with a keyboard controller 2633), a storage interface 2634, a floppy disk drive 2637 operative to receive a floppy disk 2638, a host bus adapter (HBA) interface card 2635A operative to connect with a Fibre Channel network 2690, a host bus adapter (HBA) interface card 2635B operative to connect to a SCSI bus 2639, and an optical disk drive 2640 operative to receive an optical disk 2642. Also included are a mouse 2646 (or other point-and-click device, coupled to bus 2612 via serial port 2628), a modem 2647

(coupled to bus 2612 via serial port 2630), and a network interface 2648 (coupled directly to bus 2612).

Bus 2612 allows data communication between central processor 2614 and system memory 2617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the application 104 to implement the present systems and methods may be stored within the system memory 2617. Applications resident with computer system 2610 are generally stored on and accessed via a computer readable medium, such as a hard disk drive (e.g., fixed disk 2644), an optical drive (e.g., optical drive 2640), a floppy disk unit 2637, or other storage medium. Additionally, applications can be in the form of electronic signals modulated in accordance with the application and data communication technology when accessed via network modem 2647 or interface 2648.

Storage interface 2634, as with the other storage interfaces of computer system 2610, can connect to a standard computer readable medium for storage and/or retrieval of information, such as a fixed disk drive 2644. Fixed disk drive 2644 may be a part of computer system 2610 or may be separate and accessed through other interface systems. Modem 2647 may provide a direct connection to a remote server via a telephone link or to the Internet via an internet service provider (ISP). Network interface 2648 may provide a direct connection to a remote server via a direct network link to the Internet via a POP (point of presence). Network interface 2648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 26 need not be present to practice the present disclosure. The devices and subsystems can be interconnected in different ways from that shown in FIG. 26. The operation of a computer system such as that shown in FIG. 26 is readily known in the art and is not discussed in detail in this application. Code to implement the present disclosure can be stored in computer-readable storage media such as one or more of system memory 2617, fixed disk 2644, optical disk 2642, or floppy disk 2638. The operating system provided on computer system 2610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 27:
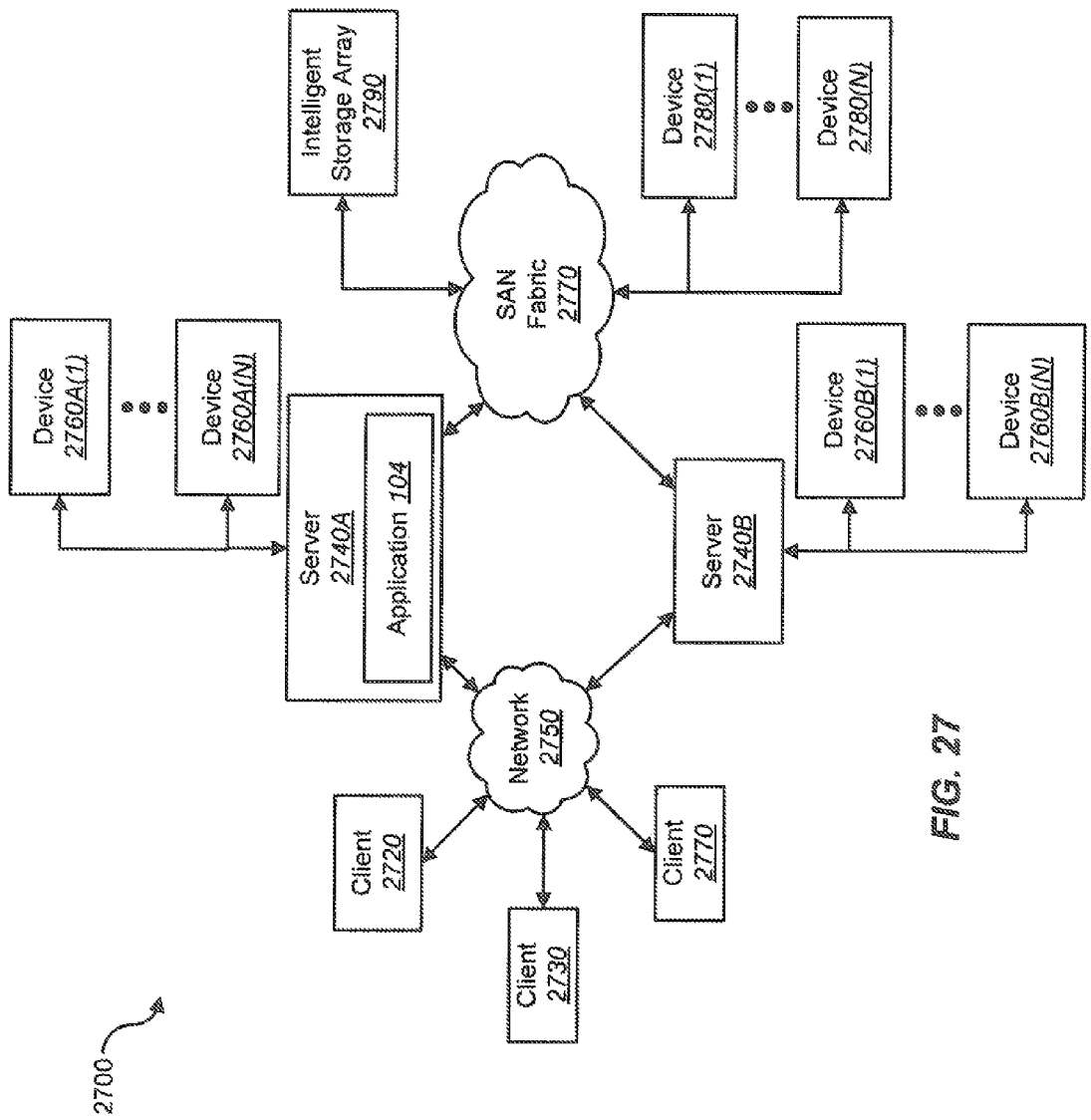
FIG. 27 is a block diagram depicting a network architecture in which client systems, as well as storage servers (any of which can be implemented using computer system), are coupled to a network.

FIG. 27 is a block diagram depicting a network architecture 2700 in which client systems 2710, 2720 and 2730, as well as storage servers 2740A and 2740B (any of which can be implemented using computer system 2710), are coupled to a network 2750. In one embodiment, the application 104 may be located within a server 2740A, 2740B to implement the present systems and methods. The storage server 2740A is further depicted as having storage devices 2760A(1)-(N) directly attached, and storage server 2740B is depicted with storage devices 2760B(1)-(N) directly attached. SAN fabric 2770 supports access to storage devices 2780(1)-(N) by storage servers 2740A and 2740B, and so by client systems 2710, 2720 and 2730 via network 2750. Intelligent storage array 2790 is also shown as an example of a specific storage device accessible via SAN fabric 2770.

With reference to computer system 2610, modem 2647, network interface 2648 or some other method can be used to provide connectivity from each of client computer systems 2710, 2720 and 2730 to network 2750. Client systems 2710, 2720 and 2730 are able to access information on storage server 2740A or 2740B using, for example, a web browser or other client software (not shown). Such a client allows client systems 2710, 2720 and 2730 to access data hosted by storage server 2740A or 2740B or one of storage devices 2760A(1)-(N), 2760B(1)-(N), 2780(1)-(N) or intelligent storage array 2790. FIG. 27 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing connections to process data, comprising:
    establishing a connection with a connection point to determine a connection point assignment for each of one or more targets;
    arranging the one or more targets in groups according to the connection point assignment for each of the one or more targets;
    establishing a connection with a first connection point;
    establishing a connection with a second connection point;
    processing data from a first group of one or more targets, wherein each target in the first group is assigned to the first connection point;
    processing data from a second group of one or more targets, wherein each target in the second group is assigned to the second connection point; and
    terminating the connection with the first connection point.

2. The method of claim 1, further comprising terminating the connection with the second connection point.

3. The method of claim 1, wherein the one or more targets comprise an electronic mail mailbox.

4. The method of claim 1, wherein the one or more targets are stored in one or more databases.

5. The method of claim 4, further comprising organizing the one or more databases in one or more groups of databases.

6. The method of claim 5, further comprising identifying one or more databases that have not been assigned to a group of databases.

7. The method of claim 6, further comprising assigning the one or more databases that have not been assigned to a group of databases to a default group of databases.

8. A computer system configured to manage connections to process data, comprising:
    a processor;
    memory in electronic communication with the processor;
    an archiving application, the application configured to:
        establish a connection with a connection point to determine a connection point assignment for each of one or more targets;
        arrange the one or more targets in groups according to the connection point assignment for each of the one or more targets;
        establish a connection with a first connection point;
        establish a connection with a second connection point;
        process data from a first group of one or more targets, wherein each target in the first group is assigned to the first connection point;
        process data from a second group of one or more targets, wherein each target in the second group is assigned to the second connection point; and
        terminate the connection with the first connection point.

9. The computer system of claim 8, wherein the application is further configured to terminate the connection with the second connection point.

10. The computer system of claim 8, wherein the one or more targets comprise an electronic mail mailbox.

11. The computer system of claim 8, wherein the one or more targets are stored in one or more databases.

12. The computer system of claim 11, wherein the application is further configured to organize the one or more databases in one or more groups of databases.

13. The computer system of claim 12, wherein the application is further configured to identify one or more databases that have not been assigned to a group of databases.

14. The computer system of claim 13, wherein the application is further configured to assign the one or more databases that have not been assigned to a group of databases to a default group of databases.

15. A computer-program product for managing connections to process data, the computer-program product comprising a non-transitory computer-readable storage medium having instructions thereon, the instructions comprising:
    code programmed to establish a connection with a connection point to determine a connection point assignment for each of one or more targets;
    code programmed to arrange the one or more targets in groups according to the connection point assignment for each of the one or more targets;
    code programmed to establish a connection with a first connection point;
    code programmed to establish a connection with a second connection point;
    code programmed to process data from a first group of one or more targets, wherein each target in the first group is assigned to the first connection point;
    code programmed to process data from a second group of one or more targets, wherein each target in the second group is assigned to the second connection point; and
    code programmed to terminate the connection with the first connection point.

16. The computer-program product of claim 15, wherein the one or more targets comprise an electronic mail mailbox.

* * * * *